United States Patent
Kao

(10) Patent No.: US 7,441,070 B2
(45) Date of Patent: Oct. 21, 2008

(54) METHOD FOR ACCESSING A NON-VOLATILE MEMORY VIA A VOLATILE MEMORY INTERFACE

(75) Inventor: Rom-Shen Kao, Durham, NC (US)

(73) Assignee: Qimonda North America Corp., Cary, NC (US)

(*) Notice: Subject to any disclaimer, the term of this patent is extended or adjusted under 35 U.S.C. 154(b) by 248 days.

(21) Appl. No.: 11/456,063

(22) Filed: Jul. 6, 2006

(65) Prior Publication Data

US 2008/0010418 A1  Jan. 10, 2008

(51) Int. Cl.
*G06F 12/06* (2006.01)
(52) U.S. Cl. .................. 711/103; 711/154; 711/202
(58) Field of Classification Search .................. None
See application file for complete search history.

(56) References Cited

U.S. PATENT DOCUMENTS

| | | | |
|---|---|---|---|
| 5,515,333 A | 5/1996 | Fujita et al. | |
| 5,956,743 A | 9/1999 | Bruce et al. | |
| 6,134,631 A | 10/2000 | Jennings, III | |
| 7,139,909 B2 | 11/2006 | Lee | |
| 7,221,615 B2 | 5/2007 | Wallner et al. | |
| 2003/0014688 A1 | 1/2003 | Wu | |
| 2003/0028733 A1 | 2/2003 | Tsunoda et al. | |
| 2005/0027928 A1 | 2/2005 | Avraham et al. | |
| 2006/0294295 A1 | 12/2006 | Fukuzo | |
| 2007/0028030 A1 | 2/2007 | Mahrla et al. | |
| 2007/0033487 A1 | 2/2007 | Ruckerbauer et al. | |
| 2007/0076004 A1 | 4/2007 | Wallner et al. | |
| 2007/0101158 A1* | 5/2007 | Elliott | 713/193 |
| 2007/0174602 A1 | 7/2007 | Kao | |
| 2007/0186061 A1 | 8/2007 | Oh et al. | |
| 2008/0007569 A1 | 1/2008 | Kao | |
| 2008/0010419 A1 | 1/2008 | Kao | |
| 2008/0010420 A1 | 1/2008 | Kao | |

* cited by examiner

*Primary Examiner*—Kevin Verbrugge
(74) *Attorney, Agent, or Firm*—Patterson & Sheridan, L.L.P.

(57) ABSTRACT

Embodiments of the invention provide a method, devices, and system for accessing data in a nonvolatile memory device via a volatile memory device. In one embodiment, the method includes configuring a size and a base address of an overlay window within an address space of the volatile memory device. The overlay window includes a range of memory addresses. The method also includes receiving an access command via a volatile memory interface of the volatile memory device and using the access command to access a memory array of the volatile memory device if an address of the access command is outside of the overlay window. The method further includes using the access command to access the nonvolatile memory device via a nonvolatile memory interface of the volatile memory device if the address of the access command is within the overlay window.

37 Claims, 20 Drawing Sheets

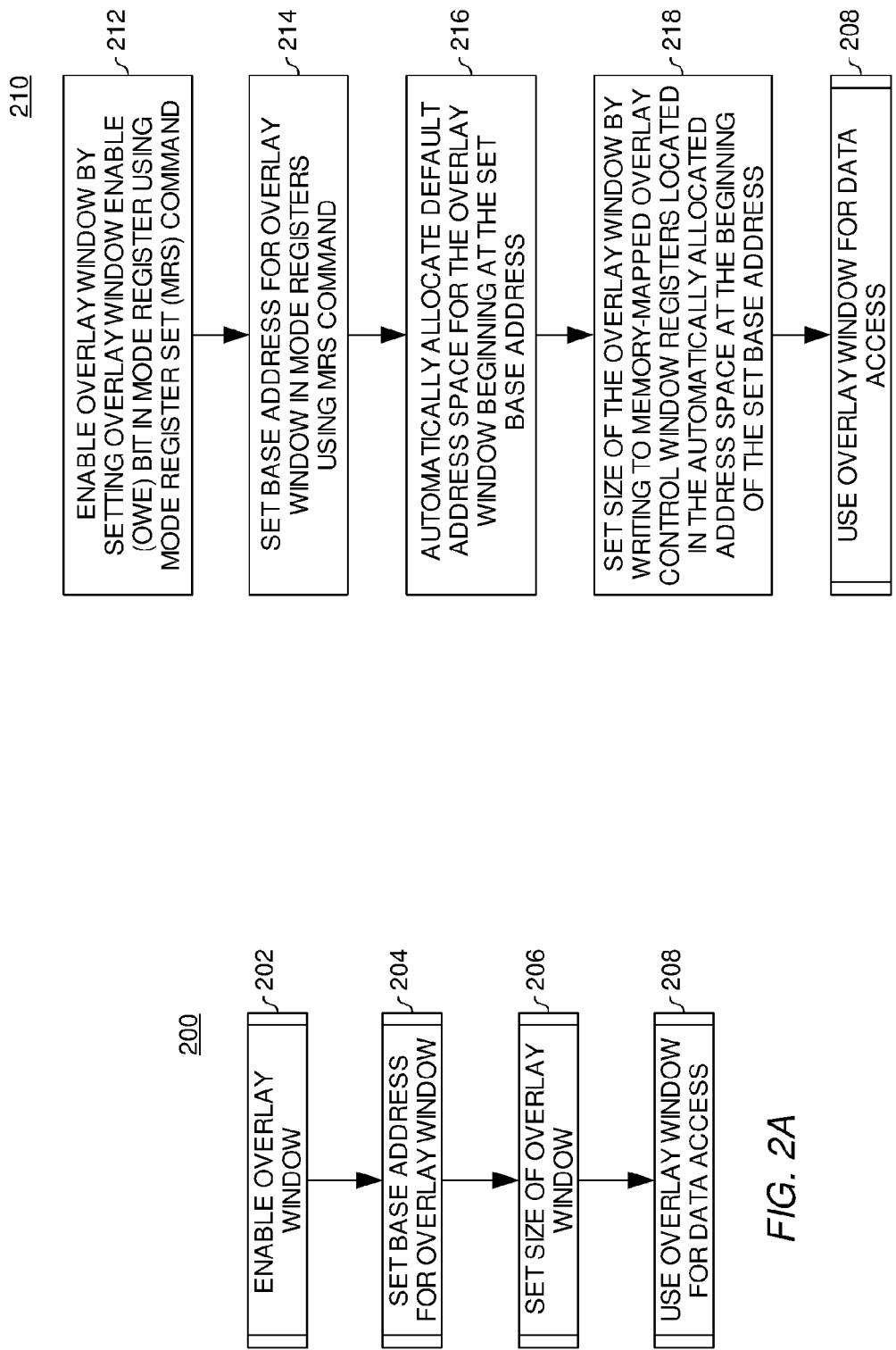

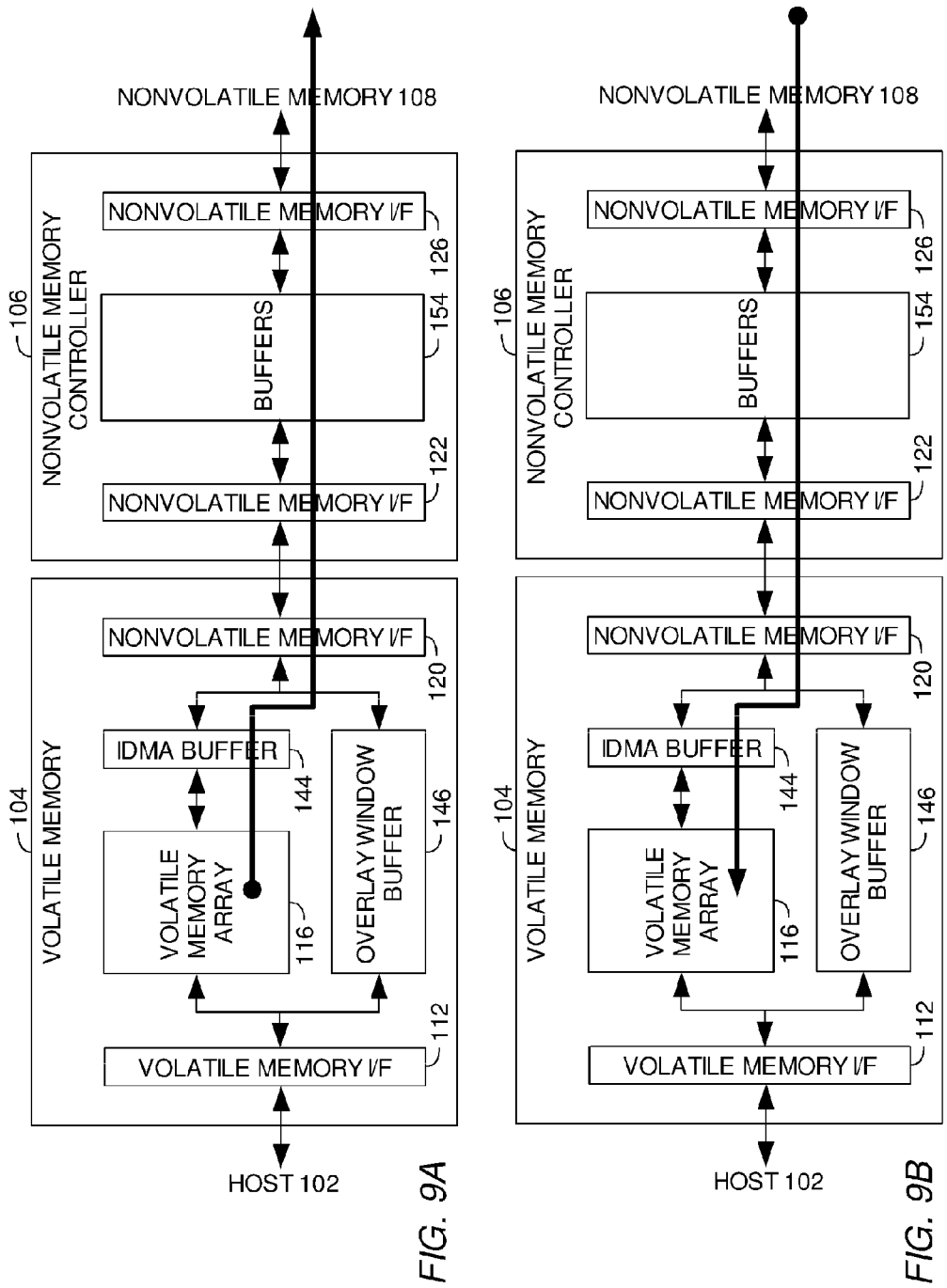

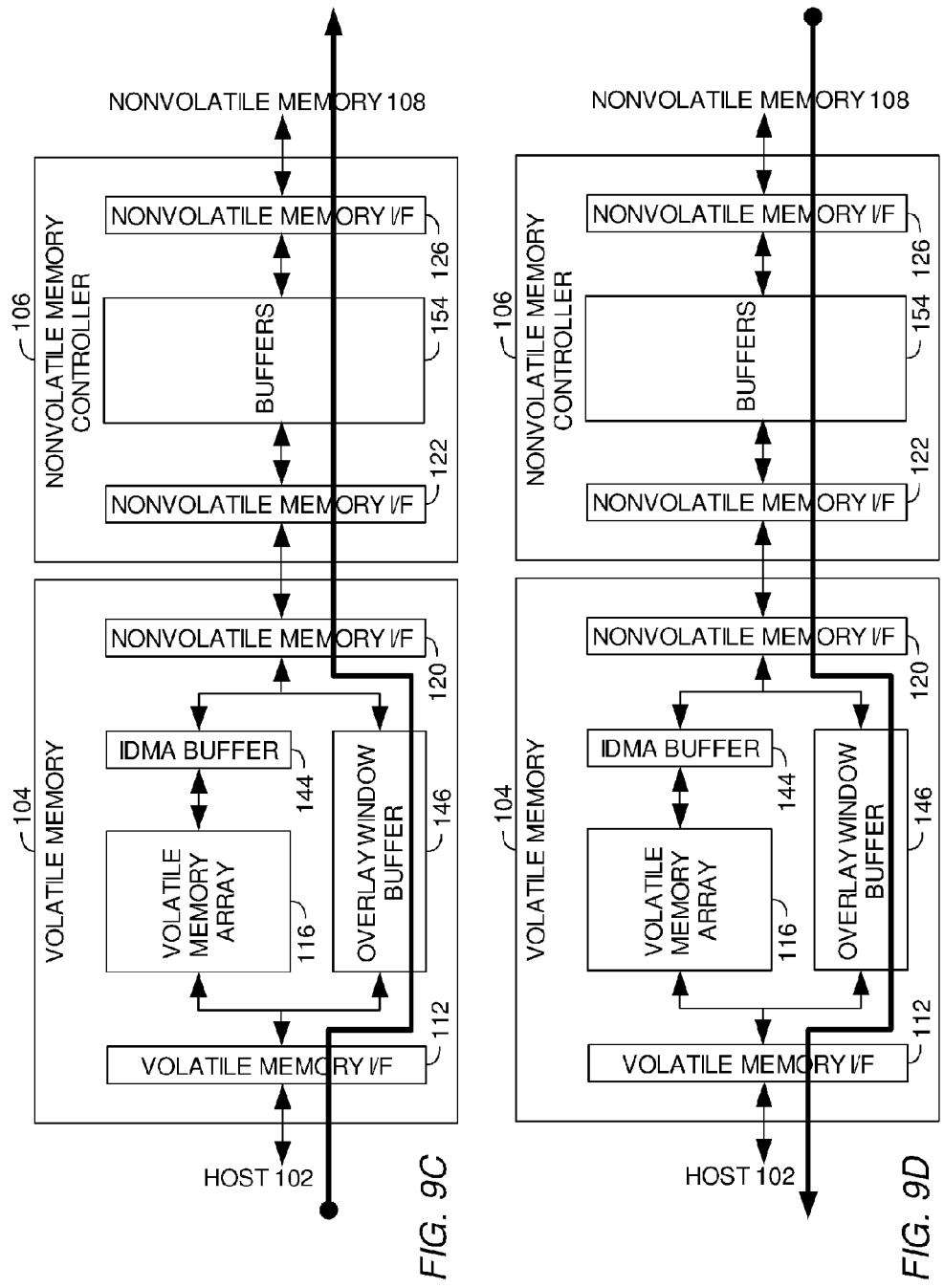

METHOD FOR ACCESSING A NON-VOLATILE MEMORY VIA A VOLATILE MEMORY INTERFACE

CROSS-REFERENCE TO RELATED APPLICATIONS

This application is related to U.S. patent application Ser. No. 11/456,061, entitled CONTROL PROTOCOL AND SIGNALING IN A NEW MEMORY ARCHITECTURE, U.S. patent application Ser. No. 11/456,064, entitled SYSTEM AND METHOD FOR ISSUING COMMANDS, and U.S. patent application Ser. No. 11/456,067, entitled METHOD FOR ACCESSING CONTROL REGISTERS VIA A MEMORY DEVICE, all of which filed on Jul. 6, 2006. Each of these related patent applications is herein incorporated by reference in its entirety.

BACKGROUND OF THE INVENTION

1. Field of the Invention

The invention generally relates to accessing memory in a computer system.

2. Description of the Related Art

Many modern electronic devices such as cell phones, PDAs, portable music players, appliances, and so on typically incorporate an embedded computer system. An embedded computer system typically contains a computer processor (referred to as a host), non-volatile memory (such as a flash memory and/or ROM memory), and volatile memory such as a dynamic random access memory (DRAM). The host may include a central processing unit (CPU), digital signal processor (DSP), microcontroller unit (MCU) or direct memory access (DMA) data transmission device. The embedded system may also include a nonvolatile memory controller which may be used to control and/or access the nonvolatile memory.

In the embedded system, the volatile memory may typically be accessed more quickly than non-volatile memory. Thus, for example, code executed by the host may be stored in the volatile memory and accessed from the volatile memory by the host. However, because volatile memory typically requires a power source to maintain data stored therein, when the embedded system is powered down, the volatile memory is typically erased. Accordingly, the nonvolatile memory, which typically does not require a power source to maintain stored data, may be used to store the code executed by the host while the embedded system is powered down. When the embedded system is powered up (e.g., when the embedded system enters a reset state), the code used by the host system may be loaded into the volatile memory and executed from the volatile memory by the host. The process of loading code stored in the non-volatile memory into the volatile memory and executing the code from the volatile memory may be referred to as code shadowing.

To maintain flexibility in accessing data in the embedded system, there may be a desire to transfer data between the host, volatile memory, and nonvolatile memory in a variety of ways. For example, there may be a desire to perform data transfers between the volatile memory and the host, the non-volatile memory and the host, and the volatile memory and the nonvolatile memory. While maintaining flexibility in accessing data in the embedded system, there may also be a desire to reduce the cost and complexity of the interface between the host and the components of the memory system.

Accordingly, what is needed is an improved system and method for accessing memory in an embedded system.

SUMMARY OF THE INVENTION

Embodiments of the invention provide a method, devices, and system for accessing data in a nonvolatile memory device via a volatile memory device. In one embodiment, the method includes configuring a size and a base address of an overlay window within an address space of the volatile memory device. The overlay window includes a range of memory addresses. The method also includes receiving an access command via a volatile memory interface of the volatile memory device and using the access command to access a memory array of the volatile memory device if an address of the access command is outside of the overlay window. The method further includes using the access command to access the nonvolatile memory device via a nonvolatile memory interface of the volatile memory device if the address of the access command is within the overlay window.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 2A-B are flow diagrams depicting processes for configuring an overlay window according to embodiments of the invention;

FIGS. 9A-D are block diagrams depicting data transfers in an embedded system according to embodiments of the invention;

DETAILED DESCRIPTION OF THE PREFERRED EMBODIMENT

Embodiments of the invention provide a method, devices, and system for accessing data in a nonvolatile memory device via a volatile memory device. In one embodiment, the method includes configuring a size and a base address of an overlay window within an address space of the volatile memory device. The overlay window includes a range of memory addresses. The method also includes receiving an access command via a volatile memory interface of the volatile memory device and using the access command to access a memory array of the volatile memory device if an address of the access command is outside of the overlay window. The method further includes using the access command to access the nonvolatile memory device via a nonvolatile memory interface of the volatile memory device if the address of the access command is within the overlay window.

An Embedded System

Figure 1A:
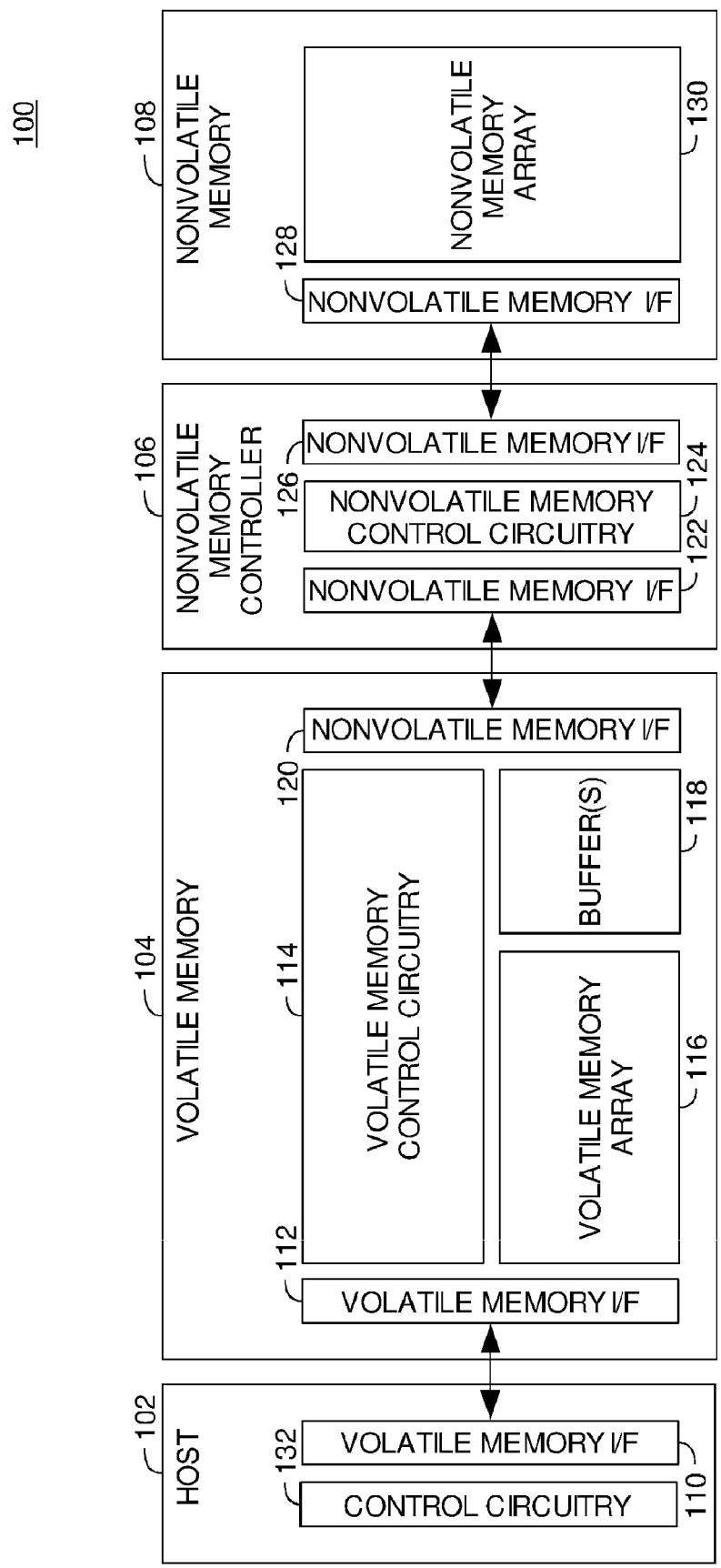
FIGS. 1A-C are block diagrams depicting embedded systems according to embodiments of the invention.

FIG. 1A is a block diagram depicting an embedded system 100 according to one embodiment of the invention. As depicted, the embedded system 100 may include a host 102, a volatile memory 104, a nonvolatile memory controller 106, and a nonvolatile memory 108.

In one embodiment, the host 102 may include control circuitry 132 and a volatile memory interface 110 for communicating with a volatile memory interface 112 of the volatile memory 104. In one embodiment, the volatile memory interface 112 may include an interface which conforms to the Joint Electron Device Engineering Council (JEDEC) Low Power Double Data Rate (LPDDR) synchronous dynamic random access memory (SDRAM) Specification. Optionally, any other appropriate volatile memory interface (e.g., utilizing DRAM interface control signals such as write enable (WE), row access strobe (RAS), column access strobe (CAS), and chip select (CS)) may be used. The control circuitry may be used, for example, to execute computer instructions and process data received from the volatile memory 104 or another location (e.g., a disk drive or other storage device). In some cases, the host 102 may also include additional circuitry, e.g., input/output (I/O) interfaces for receiving user input and additional interfaces to other embedded system components such as additional memory components, disk drives, and other devices. Also, as described below, the host 102 may utilize the volatile memory interface 112 to provide commands and information and to receive information from the volatile memory 104, nonvolatile memory controller 106, and/or nonvolatile memory 108.

In one embodiment, the volatile memory 104 may include a volatile memory interface 112 for communicating with the host 102 and a nonvolatile memory interface 120 for communicating with the nonvolatile memory controller 106. The volatile memory 104 may act as a slave (e.g., the volatile memory may be controlled by the other component of the interface) with respect to both the host 102 and the nonvolatile memory controller 106. Optionally, the volatile memory 104 may be master with respect to the nonvolatile memory controller 106. The nonvolatile memory interface 112 may include any interface used to access the nonvolatile memory 108, including, for example, the write enable (WE), output enable (OE), and chip select (CS) control signals.

The volatile memory 104 may also include volatile memory control circuitry 114 for processing commands received via the volatile memory interface 112 and/or nonvolatile memory interface 120. The volatile memory 104 may further include a volatile memory array 116 for storing data in the volatile memory 104 and one or more buffers 118 for transferring data and/or commands between the host 102, volatile memory 104, nonvolatile memory controller 106, and/or nonvolatile memory 108. In one embodiment, the buffers 118 may be dynamic RAM (DRAM) memory. Optionally, the buffers 118 may be static Ram (SRAM) memory. The volatile memory 104 may also include a nonvolatile memory interface 120 for communicating with the nonvolatile memory controller 106.

In one embodiment of the invention, the nonvolatile memory controller 106 may include a first nonvolatile memory interface 122 for communicating with the volatile memory 104 and a second nonvolatile memory interface 126 for communicating with the nonvolatile memory 108. The nonvolatile memory controller 106 may also include nonvolatile memory control circuitry 124 for controlling data transfers between the volatile memory 104, nonvolatile memory controller 106, and nonvolatile memory. The nonvolatile memory 108 may be accessed via a nonvolatile memory interface 128. Data in the nonvolatile memory 108 may be stored in the nonvolatile memory array 130.

Figure 1B:
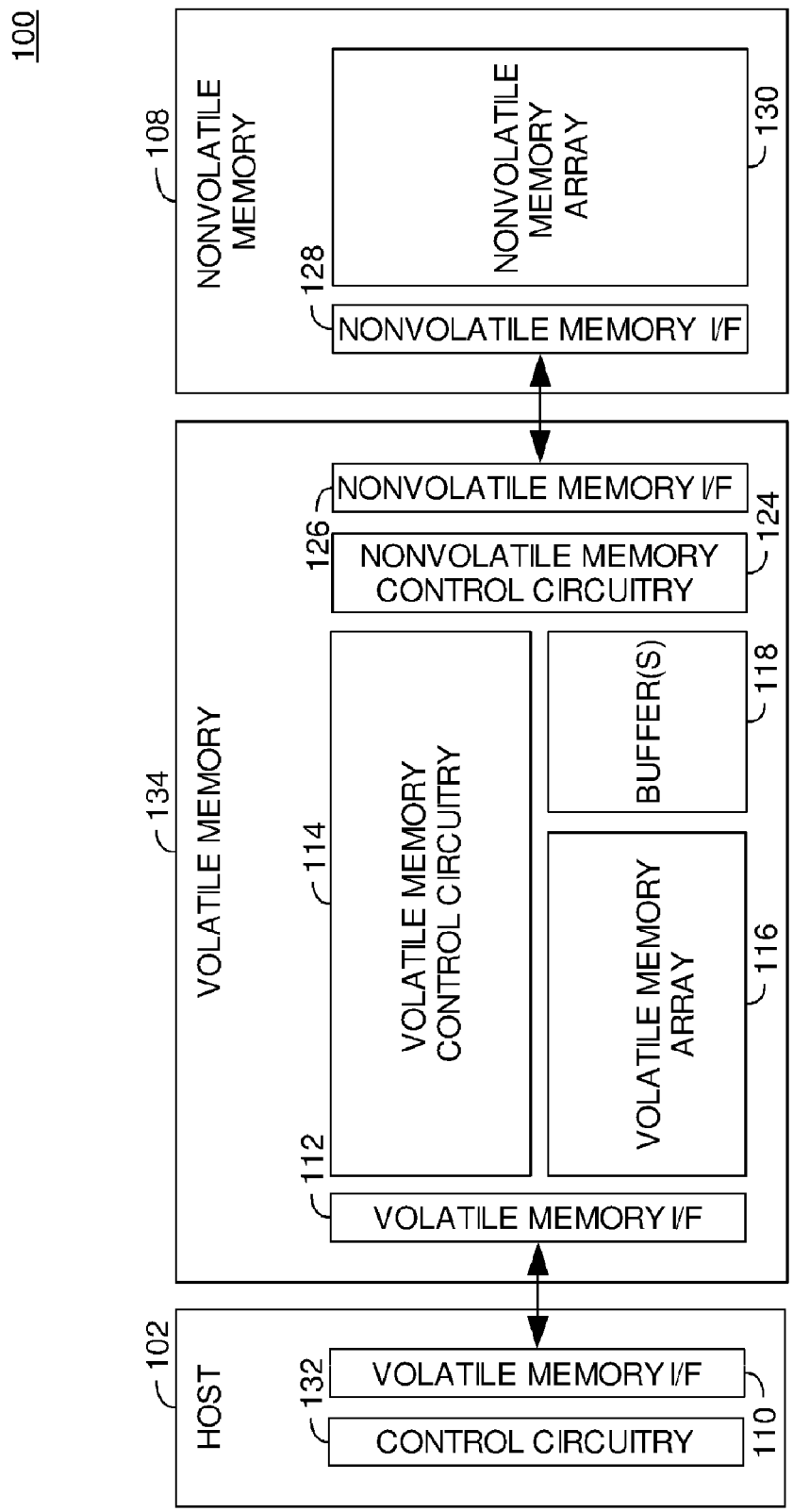

While described above with respect to a separate volatile memory 104 and nonvolatile memory controller 106, embodiments of the invention described herein may also be utilized with a volatile memory 134 which includes nonvolatile memory control circuitry 124 and accesses the nonvolatile memory 108 via the nonvolatile memory interface 128 as depicted in FIG. 1B.

Figure 1C:
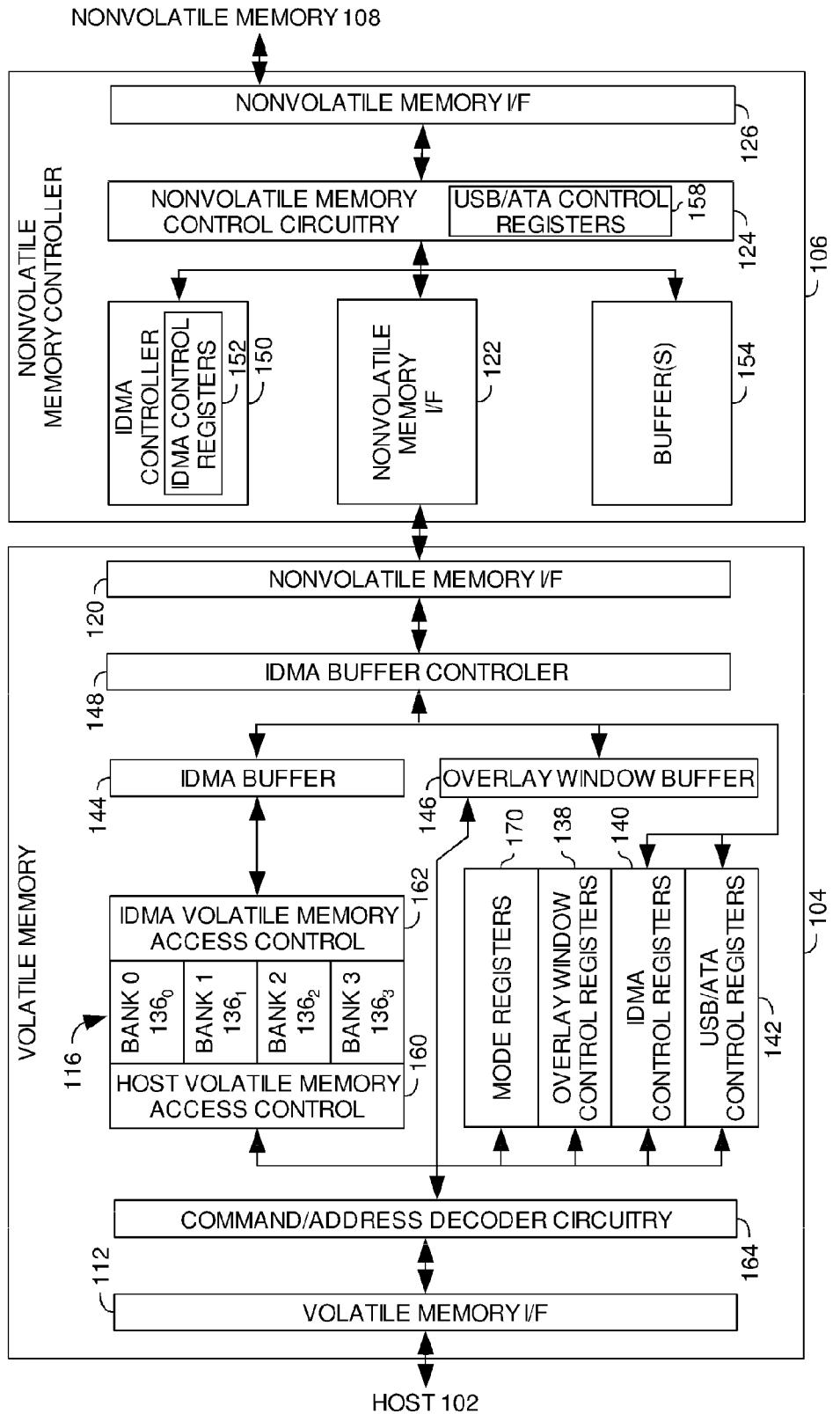

FIG. 1C is a block diagram depicting further details of the volatile memory 104 and the nonvolatile memory controller 106 according to one embodiment of the invention. As depicted, the volatile memory 104 may include command and address decoder circuitry 164 (e.g., as part of volatile memory control circuitry 114). When the command and address decoder circuitry 164 receives a command from the host 102 which accesses data in one of the banks 136 in the volatile memory array 116, the data may be accessed via the host volatile memory access control 160 for the volatile memory array 116. The volatile memory 104 may also provide mode registers 170 for controlling operation of the volatile memory 104, overlay window control registers 138 for controlling an overlay window, and an overlay window buffer 146 for transferring data between the components of the embedded system 100 as described in greater detail below.

In one embodiment of the invention, the volatile memory 104 may further provide internal direct memory access (iDMA) control registers 140 for controlling DMA transfers between the nonvolatile memory 108, nonvolatile memory controller 106, and volatile memory 104. As described below, modifying the iDMA control register settings in the volatile memory 104 may cause the volatile memory 104 to issue commands to the nonvolatile memory controller 106 causing corresponding changes to be made in iDMA control registers 152 in an iDMA controller 150 of the nonvolatile memory controller 106. Such changes may, for example, result in a command being issued to the iDMA controller 150 which causes a DMA transfer to be performed, e.g., between the volatile memory 104, nonvolatile memory controller 106, and nonvolatile memory 108.

In one embodiment, the DMA transfer may, for example, utilize buffers 154 in the nonvolatile memory controller 106 to temporarily hold data being transferred between the nonvolatile memory 108 and the volatile memory 104. With respect to the volatile memory 104, the DMA transfer may utilize an iDMA volatile memory access control 162 to access the volatile memory array 116 (e.g., to read or write data for the DMA transfer). Data from the volatile memory array 116 may be transferred to or from an iDMA buffer 144 which may in turn be used to transfer data via the nonvolatile memory interface 120 of the volatile memory 104. An iDMA buffer controller 148 may be used to control the data transfer between the iDMA volatile memory access control 162, iDMA buffer 144, and nonvolatile memory interface 120 of the volatile memory 104.

In one embodiment, the volatile memory 104 may also include Universal Serial Bus (USB)/Advanced Technology Attachment (ATA) registers 142 which may be used to control USB/ATA functionality in the nonvolatile memory controller 106. For example, as described below, when a change is made to the USB/ATA registers in the volatile memory 104, the volatile memory 104 may automatically cause a corresponding change to be made in USB/ATA control registers 158 in the nonvolatile memory control circuitry 124 of the nonvolatile memory controller 106. Thus, the host 102 may be able to access USB/ATA functionality of the nonvolatile memory controller 106 via the volatile memory 104.

Configuring an Overlay Window for Accessing Data

Figure 3A:
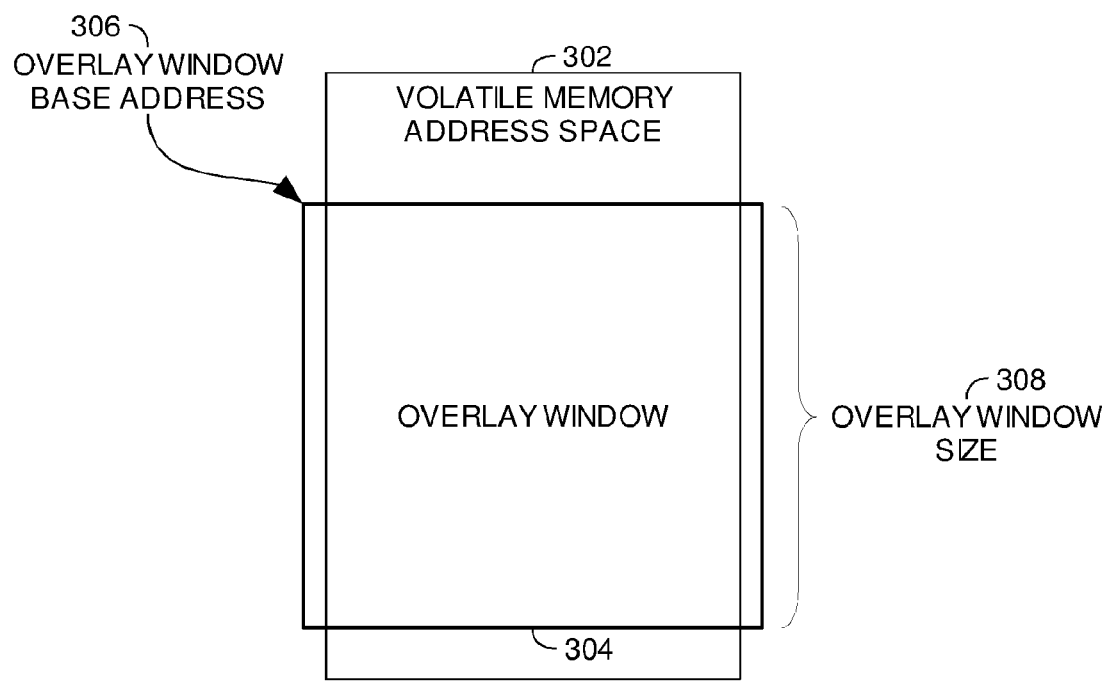
FIGS. 3A-D are block diagrams depicting aspects of overlay window configuration according to one embodiment of the invention.

In one embodiment of the invention, a portion of the volatile memory address space for the volatile memory 104 may be allocated to an overlay window. FIG. 3A is a block diagram depicting an overlay window 304 which occupies a portion of the volatile memory address space 302 according to one embodiment of the invention. The volatile memory address space 302 of the volatile memory 104 generally includes the range of addresses which may be accessed via the volatile memory interface 112 of the volatile memory 104. For example, if the volatile memory interface 112 provides a total of 18 address bits (e.g., two bank address bits BA0 and BA1 and 16 address bits A[15:0]), then the address space 302 of the volatile memory 104 may include 262,144 addresses (2 raised to the 18$^{th}$ power), which may allow up to 256 k of row entries (where each row entry corresponds to a given address) of data in the volatile memory 104 to be accessed.

In some cases, by accessing addresses in the overlay window 304 via the volatile memory interface 112, the host 102 may be able to access data in the nonvolatile memory 108 as well as overlay window control registers 138, iDMA control registers 140, and USB/ATA control registers 142. Thus, the overlay window 304 may allow access to registers and memory arrays other than the volatile memory array 116 via the volatile memory interface 112. If an access command (e.g., a read or a write command) received via the volatile memory interface 112 does not fall within the range of addresses specified by the overlay window, then the access command may be used to access the volatile memory array 116. If the received address does fall within the overlay window 304, then the access command may be used to access other data (e.g., data in the overlay window buffer 146 or control registers 138, 140, 142 in the volatile memory 104).

As described above, the overlay window 304 may occupy a portion of the volatile memory address space 302. In one embodiment, the overlay window 304 may be enabled or disabled, for example, as a result of a command received via the volatile memory interface 112. Furthermore, in some cases, the volatile memory addresses occupied by the overlay window 302 may be configurable. Thus, for example, the base address 306 of the overlay window 304 as well as the size 308 of the overlay window 304 (depicted in FIG. 3A) may be configurable by modifying control register settings in the volatile memory 104.

Where the overlay window 304 occupies volatile memory address space 302 typically used to access the volatile memory array 116, the portion of the volatile memory array 116 addressed by the overlay window 304 may be inaccessible (e.g., accesses to those address may modify data outside of the volatile memory array 116). However, by moving the overlay window 304, different parts of the volatile memory array 116 may "exposed" (e.g., may be accessible via the volatile memory interface 112) or "covered up" (e.g., accesses to those address may be redirected via the overlay window 304). Furthermore, where the overlay window 304 is disabled, the entire volatile memory array 116 may be accessible via the volatile memory address space 302. Also, in one embodiment, the volatile memory address space 302 may be larger than the amount of data in the volatile memory array 116 (e.g., more data addresses than data may be provided), allowing the overlay window 304 to be placed in a portion of the volatile memory address space 302 which does not overlap data addresses for the volatile memory array 116.

FIG. 2A is a flow diagram depicting a process 200 for configuring the overlay window 304 according to one embodiment of the invention. The process 200 may begin at step 202 where the overlay window 304 enabled. At step 204, the base address 306 for the overlay window 304 may be set. The base address 306 may indicate a volatile memory address at which the overlay window 304 begins. In one embodiment, the base address 306 may be limited such that the selected base address 306 only falls on a page-size boundary. Optionally, any alignment may be used for the base address 306 (e.g., byte-alignment). At step 206, the size 308 of the overlay window 304 may be set. The size 308 of the overlay window 304 may, for example, indicate a range of volatile memory addresses, beginning at the base address 306, which the overlay window 304 occupies. In one embodiment, the value provided for the size 308 may be multiplied to determine the actual size (e.g., the actual size of the overlay window 304 may be the provided size multiplied by 1024 (1 K) or 2048 (2 K)) such that the size 308 allocates an integral number of blocks of memory addresses for the overlay window 304. At step 208, the overlay window 304 may be used for data access (e.g., to access the overlay window buffer 146 and/or control registers 138, 140, 142).

In general, the process 200 depicted in FIG. 2A may be performed using any method known to those skilled in the art. For example, each step may be performed by issuing commands to the volatile memory 104. Optionally, changeable default settings and/or permanent preset settings may be provided for each overlay window attribute (e.g., whether the overlay window 304 is enabled, the base address 306, and/or the size).

FIG. 2B is a flow diagram depicting an exemplary process 210 for configuring the overlay window 304 according to one embodiment of the invention. The process 210 may begin at step 212 where the overlay window is enabled by setting an overlay window enable (OWE) bit in a mode register 170 of the volatile memory 104 using a mode register set (MRS) command. Then, at step 214, the base address 306 for the overlay window 304 may be set using an MRS command.

Figure 3B:
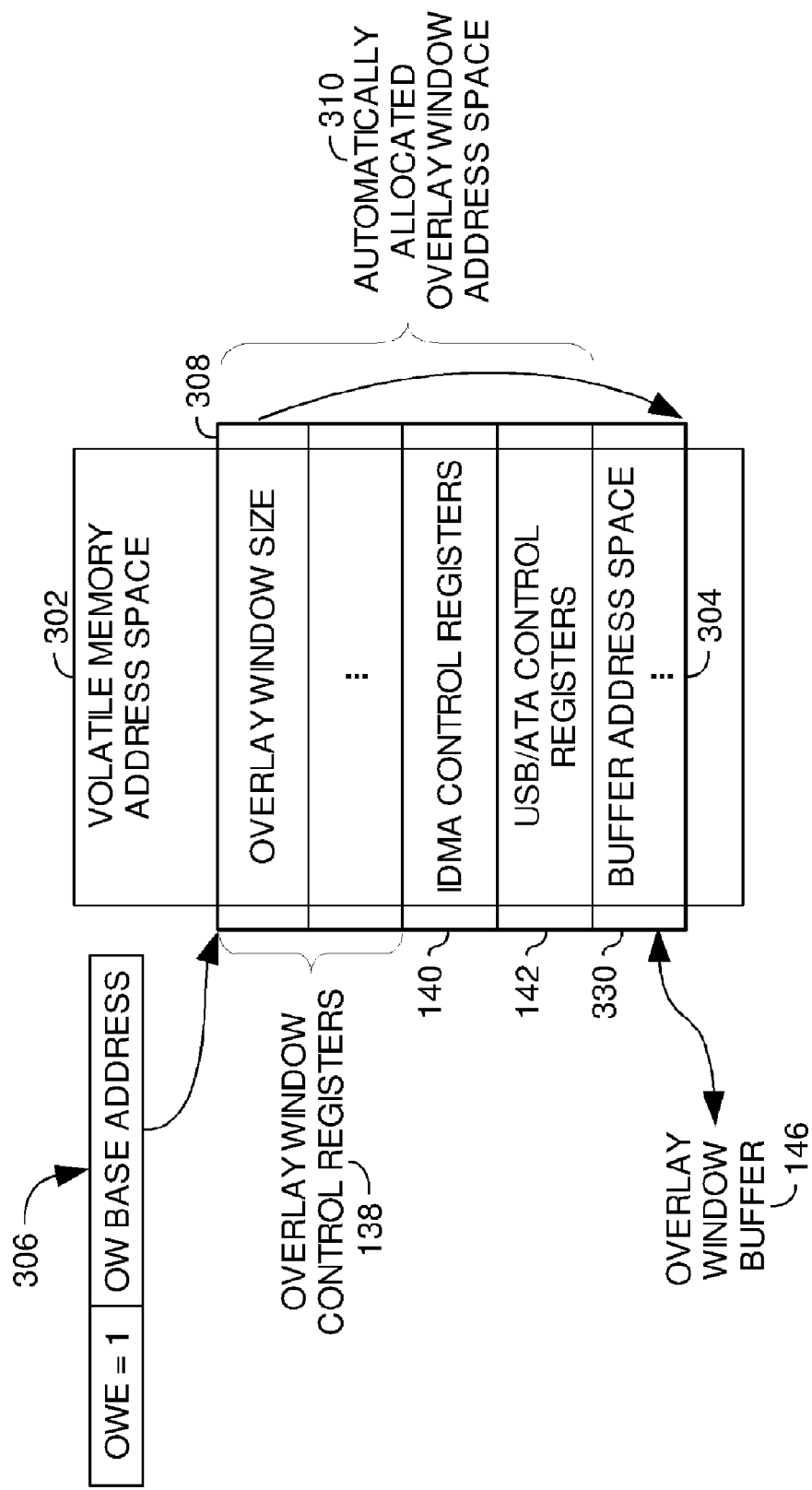

In one embodiment, after the base address 306 of the overlay window 304 is set, the volatile memory 104 may automatically allocate default address space 310 for the overlay window 304 at the beginning of the previously set base address 306 as depicted in FIG. 3B. The automatically allocated address space 310 for the overlay window 304 may be used to access overlay window control registers 138 and other control registers 140, 142. Because the control registers 138, 140, 142 may be accessed using access commands (e.g., read and write commands) issued to addresses in the volatile memory 104 via the volatile memory interface 112, the control registers 138, 140, 142 may be referred to as memory-mapped registers. Thus, by reading from or writing to an address in the volatile memory address space 302 which corresponds to the automatically allocated address space 310 for the overlay window 304, an overlay window register corresponding to the accessed address may be written to or read from.

At step 218, the size 308 of the overlay window 304 may be set by writing to the memory-mapped overlay window control registers 138 via the volatile memory interface 112. The size 308 set by writing to the overlay window control registers 138 may indicate a size of the overlay window 304 beginning from the base address 306 previously set. Optionally, the size 308 may indicate a size of the overlay window 304 in addition to and beginning from the end of the automatically allocated overlay window address space 310. The size 308 provided for the overlay window 304 may include buffer address space 330 (depicted in FIG. 3B) which is mapped to the overlay window buffer 146 and used for data access as described below. After the overlay window 304 has been configured as described in steps 212, 214, 216, and 218, the overlay window may be used for data access at step 208. For example, the allocated space for the overlay window 304 may be used to issue commands to the volatile memory 104, nonvolatile memory controller 106, and nonvolatile memory 108 (described in greater detail below).

Figure 3C:
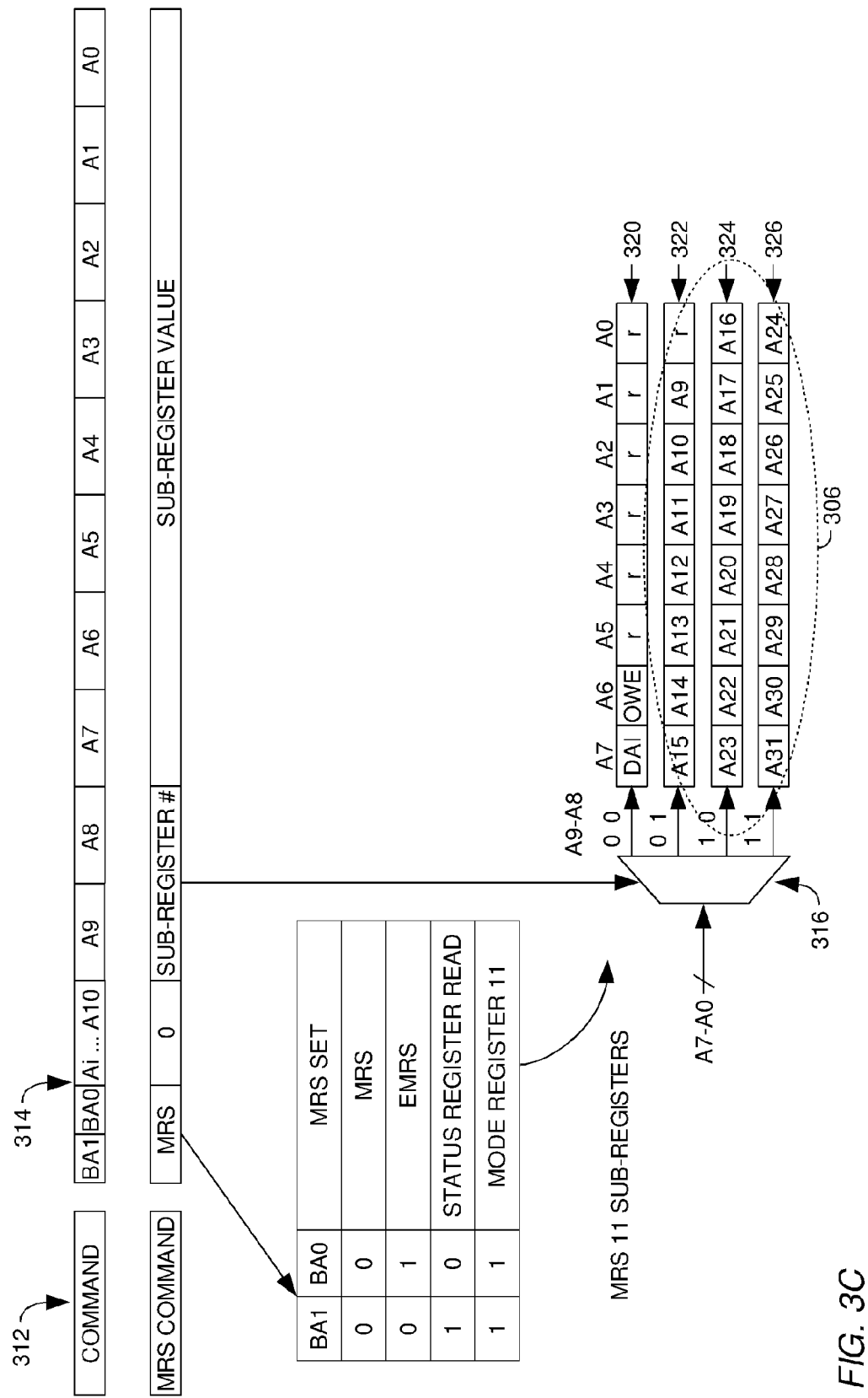

FIG. 3C is a block diagram depicting an exemplary MRS command structure for enabling the overlay window 304 and setting the overlay window base address 306 according to one embodiment of the invention. As depicted, a command issued to the volatile memory 104 via the volatile memory interface 112 may include a command portion 312 and an address portion 314 including bank address bits BA0, BA1 indicating a bank 136 of the volatile memory array 116 to be accessed and address bits Ai . . . A0 indicating an address within the specified bank 136 which is to be accessed.

If an issued command 312 is an MRS command, the bank address bits may be used to identify a MRS command type and the address bits Ai . . . A0 may be used for selecting and modifying one of the mode registers 170. As depicted, the bank address bits may be used to select one of four MRS command types. If the bank address bits are both zero, then the MRS command may be used to modify the default mode register (MRS). If BA1 is zero and BA0 is one, then the MRS command may be used to modify the extended mode register (EMRS). If BA1 is one and BA0 is zero, then the MRS command may be used for a status register read.

If both bank address bits received with an MRS command are one, then the MRS command may be a mode register 11 (MRS 11) command and may be used to modify an MRS 11 sub-register 320, 322, 324, 326 identified by address bits A9 and A8. As depicted, address bits A9 and A8 may be used by selection circuitry 316 to select the corresponding sub-register 320, 322, 324, 326 to be modified by a sub-register value provided by address bits A7-A0.

In one embodiment, to enable the overlay window 302, an MRS command may be issued with both bank address bits set to one, indicating that the MRS command is to modify one of the MRS 11 sub-registers 320, 322, 324, 326. To select the sub-register 320 containing the overlay window enable (OWE) bit, address bits A9 and A8 in the issued command may both be zero. Finally, to set the OWE bit, address bit A6 in the issued MRS 11 command may be one.

In one embodiment, the overlay window base address 306 may be an aligned address (e.g., an address which is an integral multiple of some data size indicated by a number of address bits). As depicted, the base address 306 may be obtained from the values of three sub-registers 322, 324, 326. Thus, to set the base address 306, three MRS 11 commands may be issued with [A9:A8] equal to "11", "10", and "01", respectively, thereby providing the base address bits to sub-registers 326, 324, and 322 respectively.

Figure 3D:
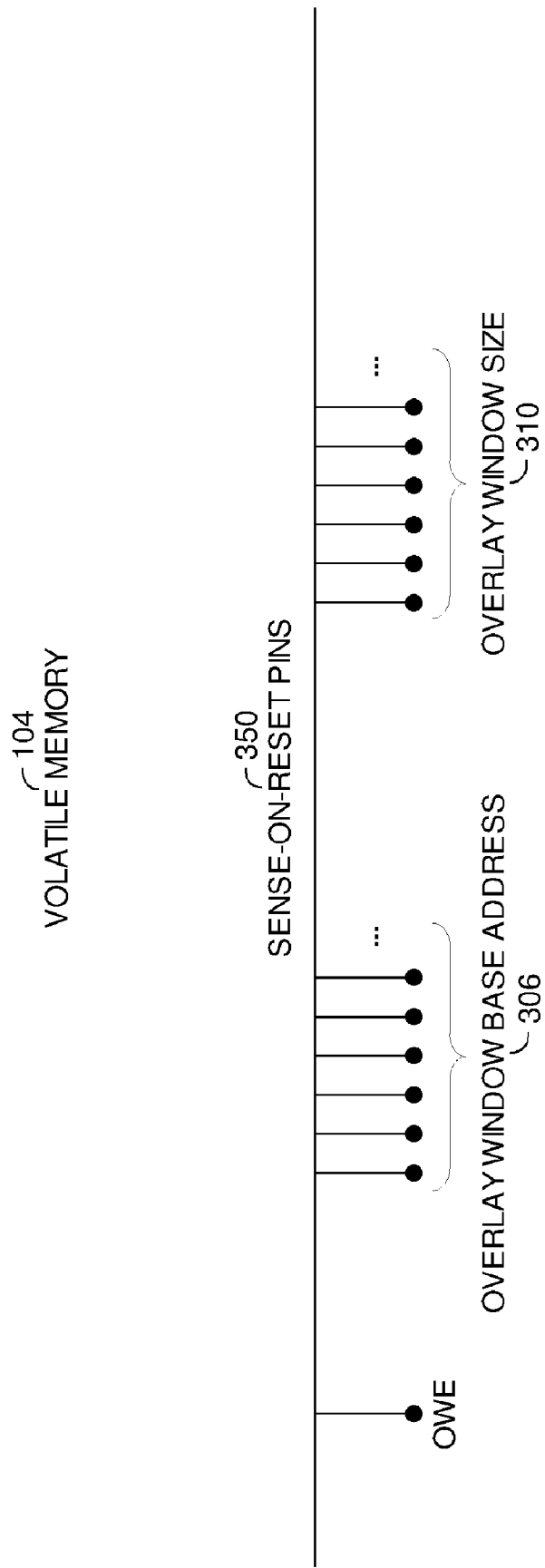

As mentioned above, in one embodiment of the invention, default settings may be provided for overlay window attributes such as the overlay window base address 306, the overlay window size 310, and whether the overlay window 304 is enabled (e.g., whether OWE is set or cleared as a default setting). In one embodiment, the default overlay window base address 306, default overlay window size 310, and OWE setting may be provided by sense-on-reset pins 350 as depicted in FIG. 3D. The pins 350 may be connected (e.g., by the manufacturer of the embedded system 100) to high or low voltage levels depending on the desired overlay window base address 306, overlay window size 310, and depending on whether the overlay window 304 is to be enabled by default. When the volatile memory 104 receives a reset signal (e.g., when power is first applied to the volatile memory 104 or when the volatile memory 104 is reset), the volatile memory 104 may automatically load the overlay window control registers 138 and mode registers 170 with the settings provided by the sense-on-reset pins 350. The settings may be subsequently overridden, for example by issuing commands to mode registers 170 and overlay window control registers 138 as described above. Optionally, the default settings may be set by blowing fuses in the volatile memory 104 according to the desired settings, or by wiring the settings into the circuitry of the volatile memory 104.

Figure 4:
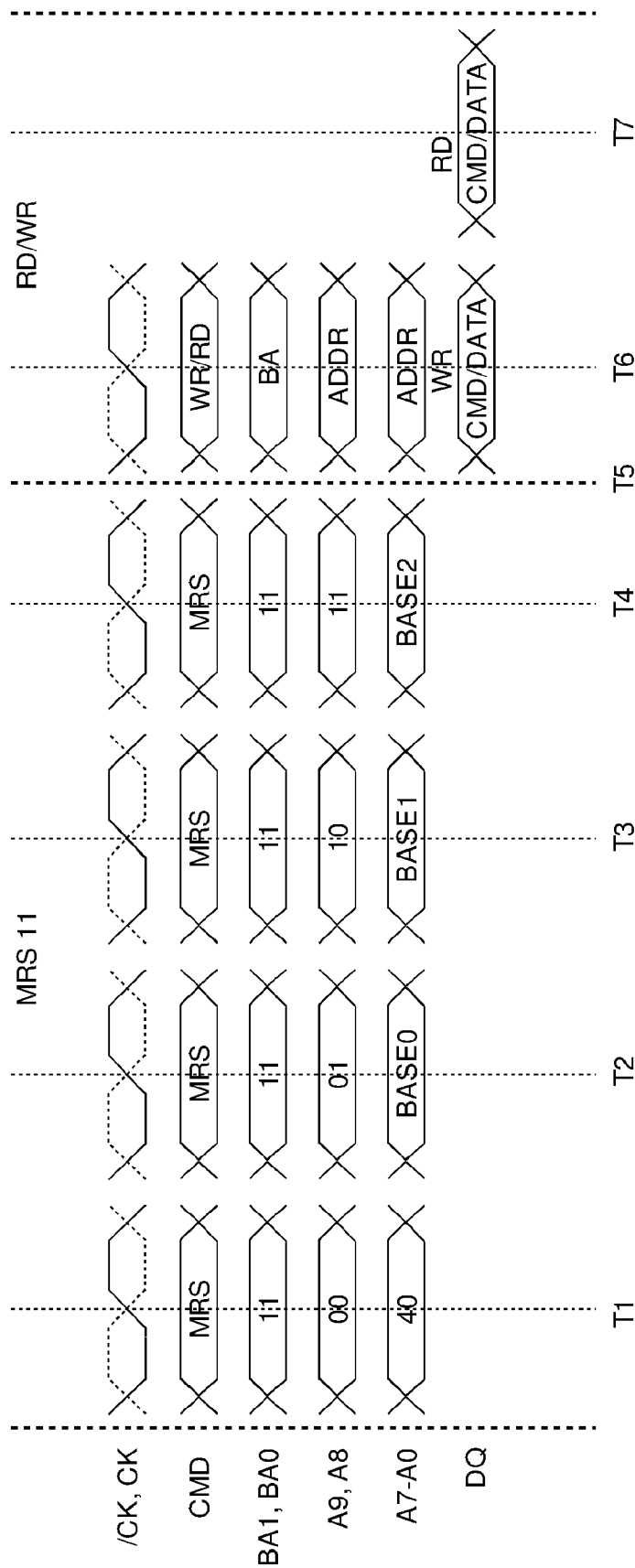
FIG. 4 is a timing diagram depicting commands issued to configure an overlay window according to one embodiment of the invention.

FIG. 4 is a timing diagram depicting commands issued to configure the overlay window 304 according to one embodiment of the invention. As depicted, at time T1 an MRS 11 command may be issued which sets the OWE bit in MRS 11 sub-register "00" (BA1, BA0 equal to "11", A9, A8 equal to "00", and A7-A0 equal to "40h" in hexadecimal such that A6 is equal to "1"). Then, at times T2-T4, additional MRS 11 commands may be issued setting the overlay window base address 306 in the MRS 11 sub-registers 322, 324, 326 (base0, base1, and base2, respectively). As described above, after the overlay window 304 has been enabled and the overlay window size 308 has been set, automatically allocated address space 310 for the overlay window 304 may be used to access data including the overlay window control registers 138. Thus, for example, at time T6, a write command may be issued which writes the overlay window size 308 to the corresponding volatile memory address in the automatically allocated address space 310. The address of the overlay window size register may be provided by the address bits BA1-BA0 and A9-A0 while the size setting may be provided via data input/outputs (DQ) of the volatile memory interface 11. Further commands, e.g., accessing the volatile memory address space 302, may be issued at step T7.

While described above with respect to enabling an overlay window 304, setting a base address 306, and setting a size 308, the commands issued to configure the overlay window 304 may be performed in any order. Also, as described above, in some cases, the window 306 may be enabled by default, and/or default values may be provided for the base address 306 and size 308. In such cases, configuration commands described above may not be utilized, or such configuration commands may be utilized only where desired by the embedded system designer.

Issuing Commands via the Overlay Window

In one embodiment of the invention, after the overlay window 304 has been configured, the overlay window 304 may be used to access the control registers 138, 140, 142 and overlay window buffer 146. By accessing the control registers 138, 140, 142 and overlay window buffer 146, the host 102 may be able to issue commands via the volatile memory interface 110 which result in configuration changes in the nonvolatile memory controller 106 and/or data transfers between the volatile memory 104 and the nonvolatile memory 108 via the nonvolatile memory controller 106.

Figure 5A:
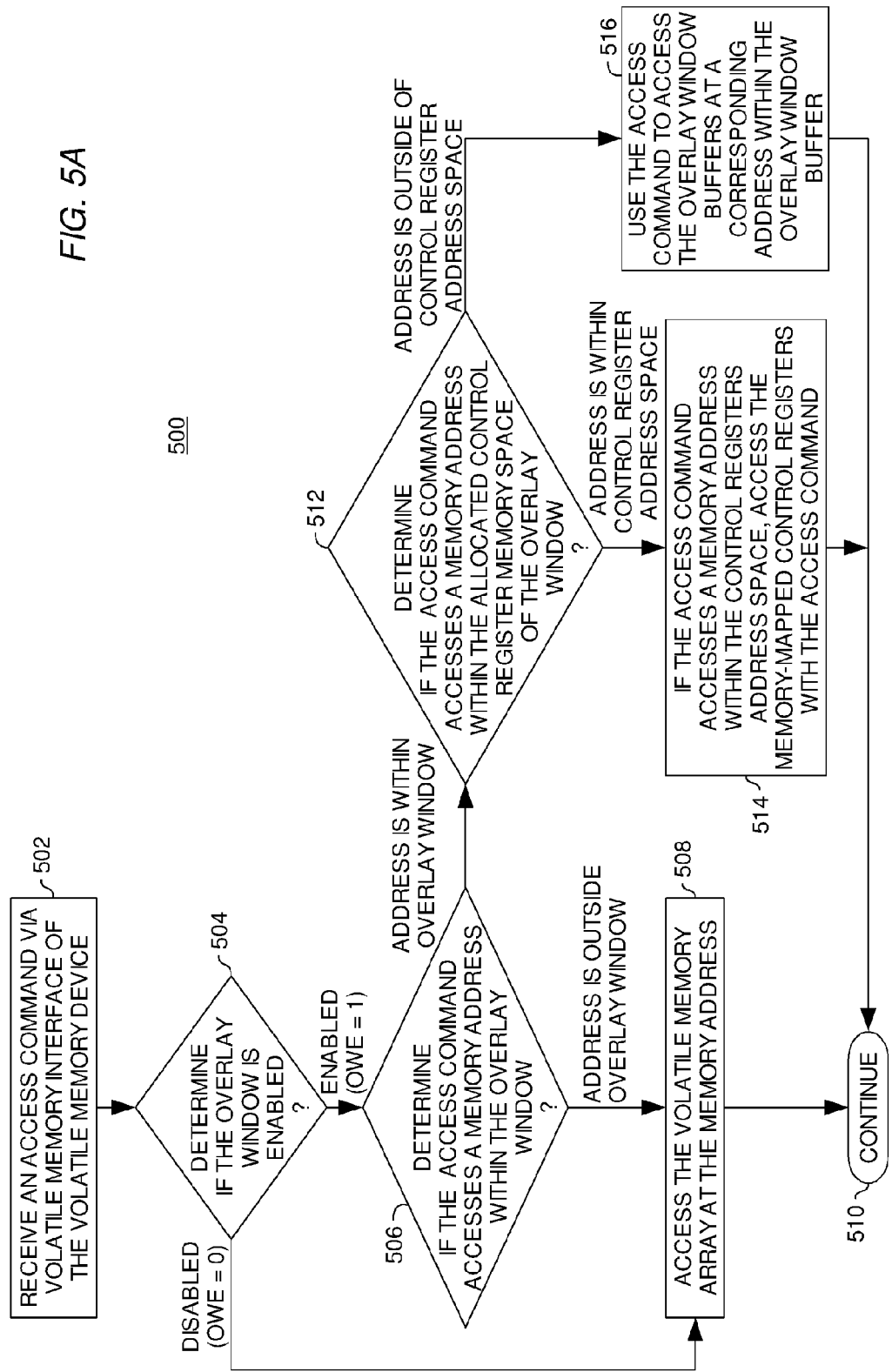
FIGS. 5A-B are flow diagrams depicting processes for accessing data and issuing commands via an overlay window according to embodiments of the invention.

FIG. 5 is a flow diagram depicting a process 500 for accessing the control registers 138, 140, 142 and overlay window buffer 146 via the overlay window 304 according to one embodiment of the invention. The process 500 may begin at step 502 where an access command is received via the volatile memory interface 112 of the volatile memory 104. At step 504, a determination may be made of whether the overlay window 304 is enabled. If the overlay window 304 is disabled (OWE=0), then the access command may be used to access the volatile memory array 116 at step 508. If the overlay window is enabled (OWE=1), then at step 506, a determination may be made of whether the access command accesses a memory address within the overlay window 304. If the accessed address is outside the overlay window 304, then the access command may be used to access the volatile memory array 116 at the memory address provided by the command at step 508.

If, however, the address for the access command is within the overlay window 304, then a determination may be made at step 512 of whether the access command access a memory address within the automatically allocated control register address space 310 of the overlay window 304. If the address is within the control register address space 310 of the overlay window 304, then the access command may be used to access the memory-mapped control registers (e.g., the overlay window control registers 138 or other memory-mapped registers 140, 142) at step 514. If the address provided by the access command is within the overlay window 304 but outside the control register memory space 310 (and thus within the buffer address space 330), then the access command may be used to access a corresponding address within the overlay window buffer 146 of the nonvolatile memory 108. The process 500 may then continue at step 510.

In one embodiment of the invention, the host 102 may issue commands to the nonvolatile memory 108 and/or nonvolatile memory controller 106 by writing the commands to a control register. For example, the host 102 may issue a write command to an address of a memory-mapped control register 138, 140, 142 in the overlay window address space 304. The data written by the write command may itself be a command. When the command is written to the overlay window 304, the volatile memory 104 may use the received command to issue corresponding commands to the nonvolatile memory controller 106 and/or nonvolatile memory 108. The host 102 may determine the status of the command being executed (e.g., whether the command is pending or complete) by reading status data from an appropriate memory-mapped register 138, 140, 142 in the overlay window 304. Optionally, an interrupt signal issued to the host 102 by the volatile memory 104 may be used to signal to the host 102 that the command has been completed. In some cases, where an interrupt signal is utilized, the volatile memory interface 112 may be modified to accommodate such an interrupt.

In some cases, where the command written to the overlay window 304 uses data from the host 102 or returns data from the nonvolatile memory 108, the data may be transferred using the overlay window buffer 146. Optionally, the data may also be obtained from a memory-mapped register within the control window 304 or from the volatile memory array 116. Where data for the command is placed in the overlay window buffer 146 or a memory-mapped register within the overlay window 304, the host 102 may access the overlay window buffer 146 via the overlay window 304 as described above. Buffers 144 and 146 in the volatile memory 104 and nonvolatile memory controller 106, respectively, may also be used to transfer data between the nonvolatile memory 108 and the volatile memory 104.

Figure 5B:
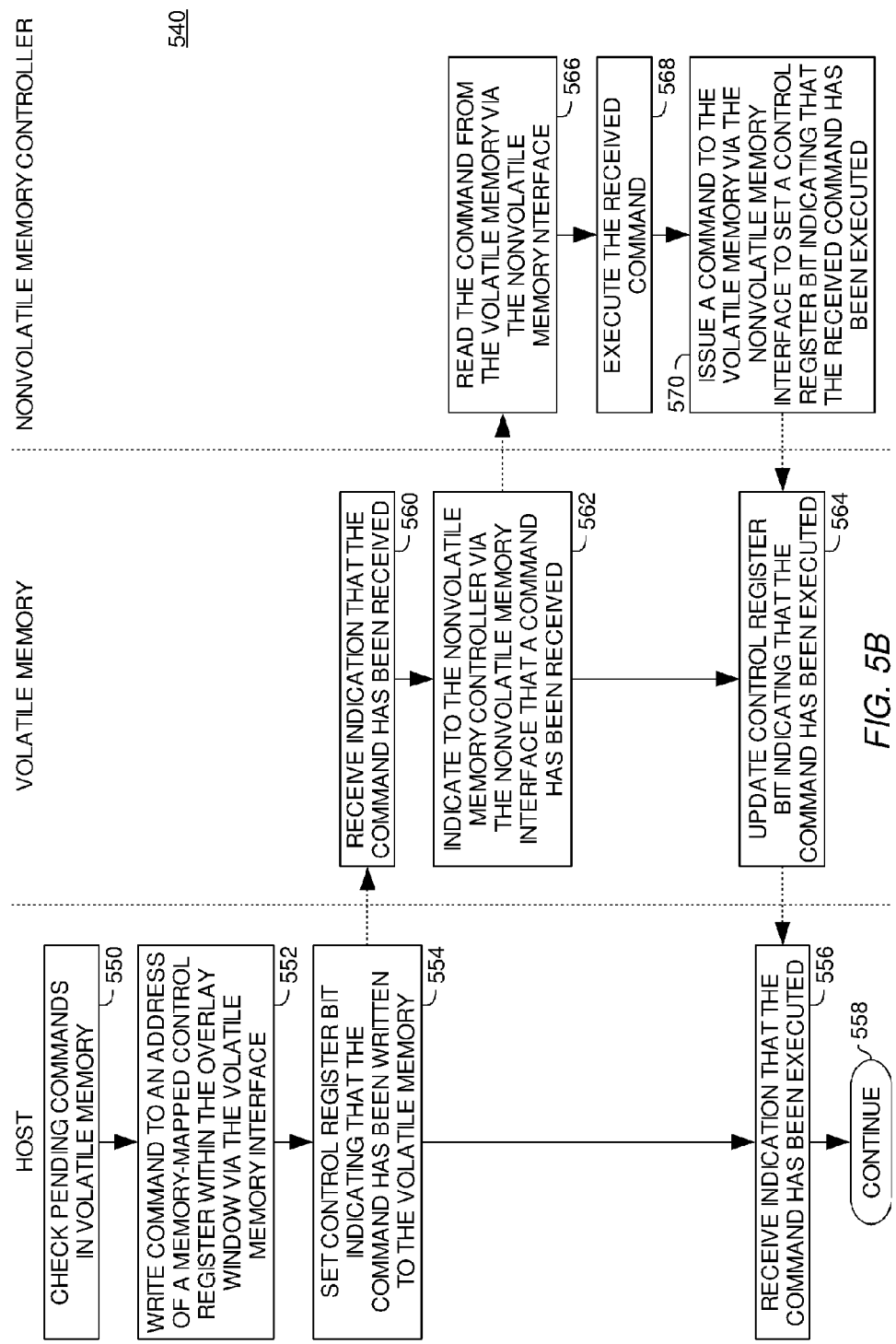

FIG. 5B is a flow diagram depicting a process 540 for executing commands written to the overlay window 304 in the volatile memory 104 according to one embodiment of the invention. The process 540 may begin at step 550 where the host 102 checks the volatile memory 104 to determine if any commands (e.g., commands previously issued by the host 102) are pending. If previous commands have not completed and are still pending, the host 102 may wait until the previous commands are completed (e.g., until the nonvolatile memory controller 106 has completed execution of the previous commands). In one embodiment, the host 102 may determine whether a command is pending by reading a memory-mapped status register via the overlay window 304. Optionally, the volatile memory 104 may indicate to the host 102 that a previous command has been completed by issuing an interrupt to the host 102. As described above, where an interrupt signal is utilized, the volatile memory interface 112 may be modified to accommodate such an interrupt.

After determining that no commands are pending, then at step 552, the host 102 may write a command to an address of a memory-mapped control register 138, 140, 142 within the overlay window 304 of the volatile memory 304, thereby placing the command in the control register. In some cases, if the command requires additional data, the data may also be written to a control register 138, 140, 142 or to the memory-mapped overlay window buffer 146. At step 554, the host 102 may set a control register bit indicating that the command has been written to the volatile memory 104. In one embodiment, the host 102 may set the control register bit by writing to an address corresponding to a memory-mapped control register 138, 140, 142 in the overlay window 304. Optionally, in one embodiment, the volatile memory 104 may automatically detect that the command has been written without the control register bit being set.

At step 560, the volatile memory 104 may receive the indication that the command has been written by the host 102. Then, at step 562, the volatile memory 104 may indicate to the nonvolatile memory controller 106 via the nonvolatile memory interface 120 that a command has been received. In one embodiment, the volatile memory 104 may indicate that a command has been received by issuing an interrupt to the nonvolatile memory controller 106. Upon receiving the interrupt, the nonvolatile memory controller 106 may read the command via its nonvolatile memory interface 122 at step 566 and execute the received command at step 568.

Optionally, instead of issuing an interrupt to the nonvolatile memory controller 106, the volatile memory 104 may issue a corresponding command directly to the nonvolatile memory controller 106. The volatile memory 104 may also set a status register bit indicating that a new command has been received. The status register bit may be polled by the memory controller 106. Upon detecting that the bit has been set, the memory controller 106 may retrieve the command, e.g., by issuing a read command to the volatile memory 104.

Executing the received command may include reading data from the nonvolatile memory 108 and placing the read data in the volatile memory array 116 or overlay window buffer 146 of the volatile memory 104. Executing the command may also include writing data from the overlay window buffer 146 or volatile memory array 116 to the nonvolatile memory 108. Executing the command may further include performing a DMA transfer between the nonvolatile memory 108 and the volatile memory 104, modifying control register settings within the nonvolatile memory controller 106 (e.g., within the iDMA controller 150 or within the nonvolatile memory control circuitry 124), performing NAND management functions, or transferring control register settings between the nonvolatile memory controller 106 and volatile memory 104 as described below.

At step 570, after the command has been executed, the nonvolatile memory controller 106 may issue a command to the volatile memory 104 via the nonvolatile memory interface 122 to set a control register bit (e.g., in one of the memory-mapped control registers 138, 140, 142) indicating that the received command has been executed. At step 564, the volatile memory 104 may update the corresponding control register bit to indicate that the command has been executed, and at step 556 the host may receive the indication that the command has been executed. The process 540 may then continue at step 558. In one embodiment, the host 102 may determine that the command has been executed by reading control register containing the set bit which indicates that the command has been executed (e.g., by polling the appropriate bit in a control register 138, 140, 142 via the overlay window 304). Optionally, in one embodiment, an interrupt may be issued to the host 102 indicating that the command has been executed.

Exemplary Memory-Mapped Registers and Buffers Accessible via the Overlay Window

Figure 6:
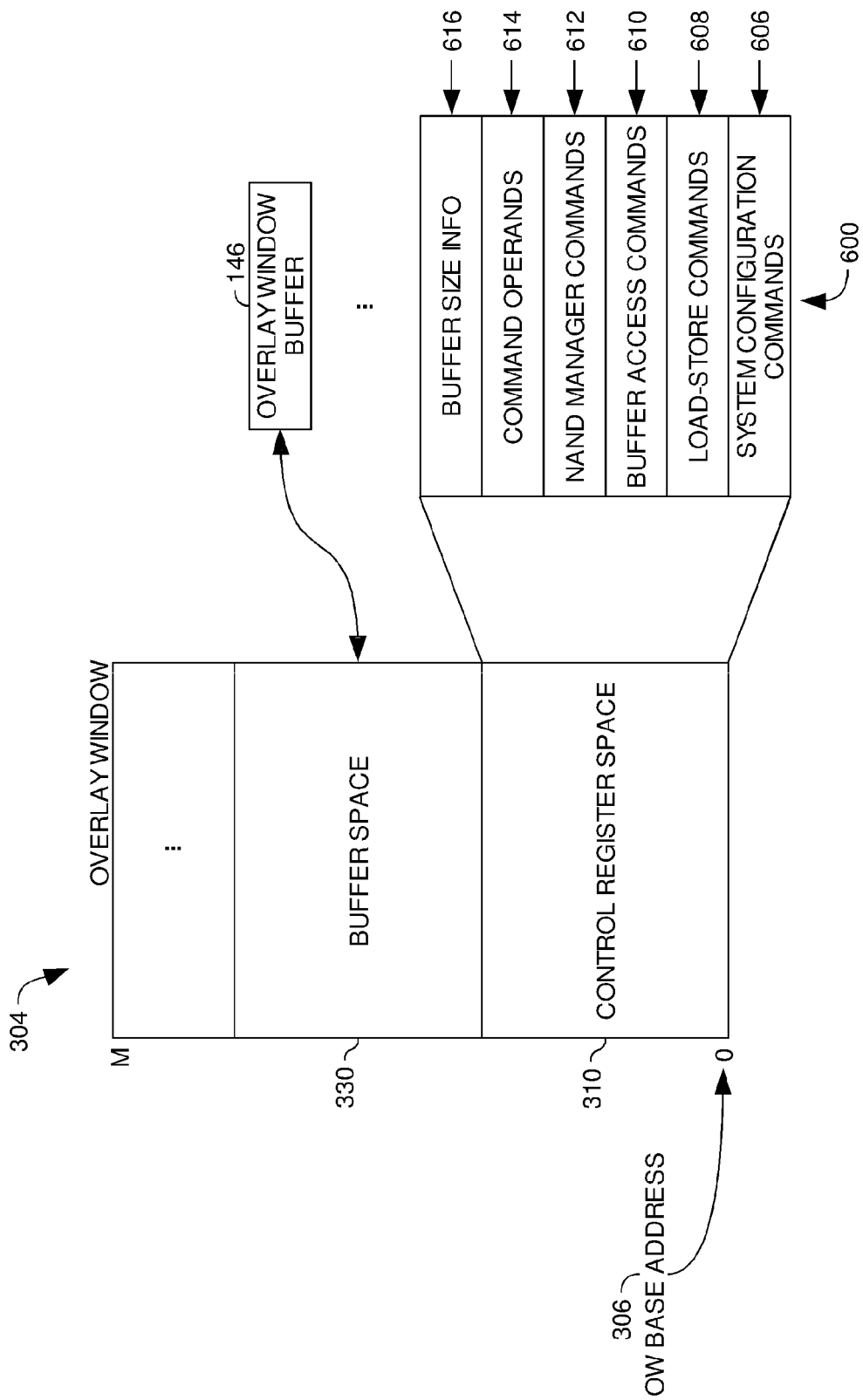
FIGS. 6-7 are block diagrams depicting control registers and buffers in an overlay window according to embodiments of the invention.

As described above, when the overlay window 304 is enabled by setting the OWE bit, control register memory space 310 may be automatically allocated. Upon setting the size 308 of the overlay window 304, additional buffer memory space 330 may be allocated. The overlay window 304 may also contain other buffers, memory-mapped registers, etc. FIG. 6 is a block diagram depicting exemplary control registers 600 mapped by the automatically allocated control register space 310. As described above, the control register space may begin at the overlay window base address 306 and extend to higher addresses (e.g., from the base address 306 to the base address 306 plus "M" in the diagram). The memory-mapped registers 600 may include system configuration registers 606, load-store command registers 608, buffer access command registers 610, NAND manager command registers 612, command operand registers 614, and buffer size information registers 616.

The system configuration registers 606 may be used to modify configuration of the embedded system 100, for example, by selecting appropriate data exchange rates between the volatile memory 104 and the nonvolatile memory controller 106. The load-store command registers 608 may receive data access commands written by the host 102. The data access commands written by the host 102 may include read commands for reading data from the nonvolatile memory 108 to a location in the volatile memory (e.g., to the overlay window buffer 146 or the volatile memory array 116). The data access commands written by the host 102 may further include write commands for writing data from the volatile memory 104 (e.g., from the overlay window buffer 146, the volatile memory array 116, or from a command operand register 614) to the nonvolatile memory 108. The data access commands written by the host 102 may further include DMA commands for performing DMA transfers between the volatile memory 104 and nonvolatile memory 108 via the nonvolatile memory controller 106.

In one embodiment, the buffer access command register 610 may be used by the host 102 to issue commands for accessing the overlay window buffer 146. The NAND manager command register 612 may be used by the host 102 to issue commands to the nonvolatile memory controller 106. For example, after the host 102 writes a NAND manager command to the NAND manager command register 612, the host 102 may set a control register bit in the volatile memory 104 indicating that the command has been written. The volatile memory 104 may then issue an interrupt to the nonvolatile memory controller 106 indicating that the NAND manager command has been received. Upon receiving the interrupt, the nonvolatile memory controller 106 may retrieve the command from the volatile memory 104 via the nonvolatile memory interface 120 of the volatile memory 104. The NAND manager command may then be executed by the nonvolatile memory control circuitry 124.

In on embodiment, the control register space 310 may also include command operand registers 614 for storing command operands and buffer size information registers 616. The buffer size information registers 616 may be used to access information, for example, about the overlay window buffer 146. The information may include the size of the buffer 146 and/or the amount of data in the buffer 146 (e.g., what portion of the buffer is being used for data storage). The information may be accessed by the host 102 or the nonvolatile memory controller 106 during a data transfer to determine whether the buffer 146 is full and to determine whether to place more data into the buffer 146 to be transferred or to read additional data from the buffer 146.

Figure 7:
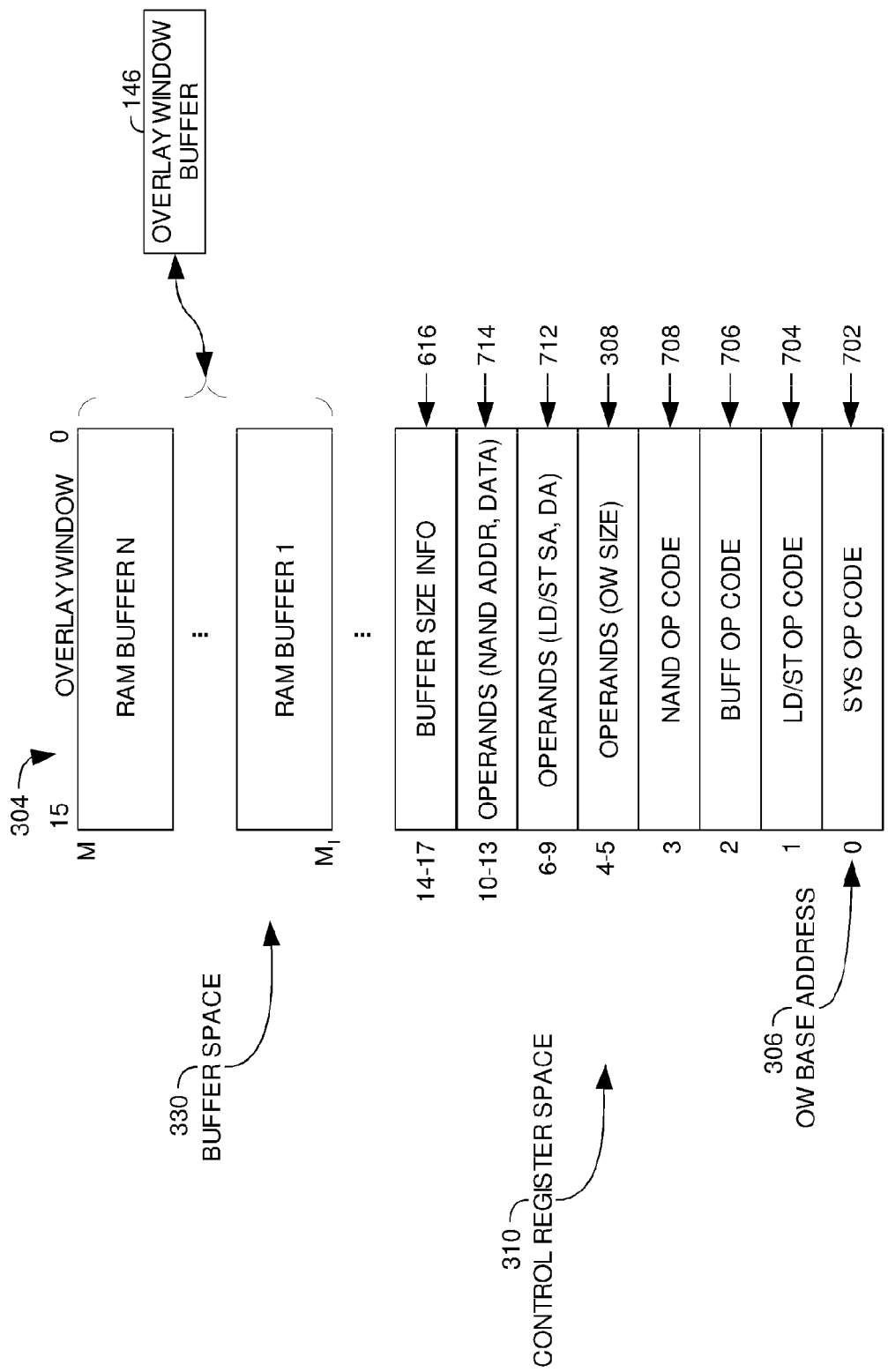

FIG. 7 is a block diagram depicting memory space allocated to each of the memory-mapped registers 600 according to one embodiment of the invention. As depicted, a system operation code (op code) register 702 may be provided at a first address (e.g., the overlay window base address 306). Similarly, a load/store (LD/ST) op code register 704 may be provided at a first offset, a buffer (BUFF) op code register 706 may be provided at a second offset, and a NAND op code register 708 may be provided at a third offset.

Operand registers 308, 712, 714 may be provided at a number of address offsets as depicted. Each of the operands may be used to provide information for executing commands specified via the op code registers 702, 704, 706, 708. The operand registers may include a register 308 for the overlay window size and a register 712 for load/store operands (e.g., including a start address (SA) and a destination address (DA) for data being transferred). The operand registers may also include an operand register 714 for storing NAND address information and other data. As described above, the memory-mapped registers 600 may also include the buffer size information register 616.

In one embodiment of the invention, the buffer space 330 may be partitioned into multiple RAM buffers [1 . . . n]. By providing multiple RAM buffers (e.g., as partition of the overlay window buffer, iDMA buffer 144, or other buffers in the volatile memory 104), the volatile memory 104 may be used by the host 102 and/or the nonvolatile memory controller 106 to perform multiple data transfers between different locations in the volatile memory array 116 and/or nonvolatile memory 108.

Specifying Operands for Commands Issued via the Overlay Window

In one embodiment of the invention, different op codes provided to the memory-mapped registers 600 may use different operand registers 308, 712, 714 located at different offsets within the control register space 310. In some cases, the command placed in an op code register 702, 704, 706, 708 may specify which operands are to be used with the op code, thereby allowing the device which reads the command (e.g., the volatile memory 104 or the nonvolatile memory controller 106) to determine where to locate the operands for the given command. Thus, in some cases, different locations and operand sizes may be used for a given command.

Figure 8:
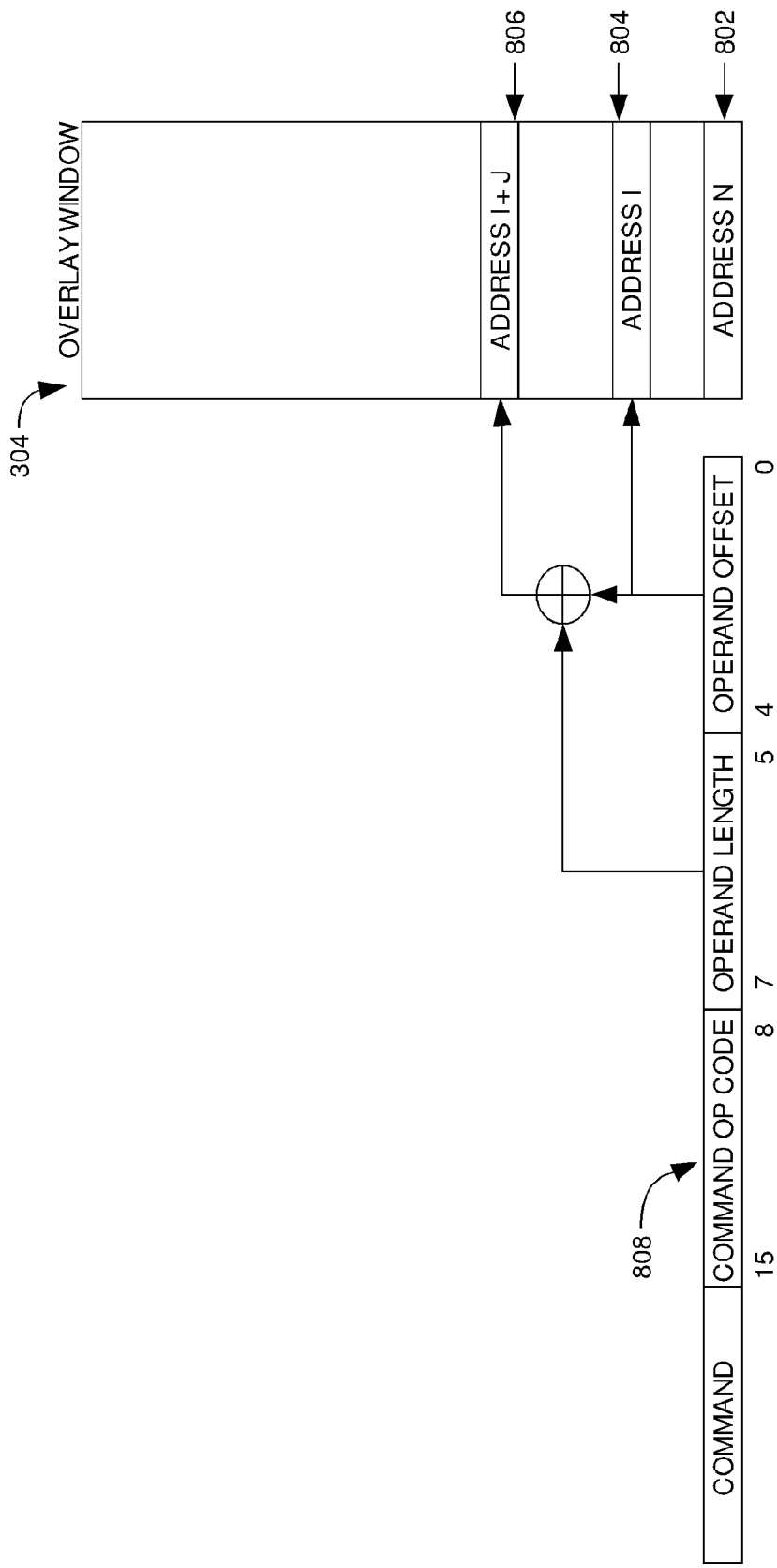
FIG. 8 is a block diagram depicting a command issued to an op code register according to one embodiment of the invention.

FIG. 8 is a block diagram depicting a command issued to an op code register (e.g., one of the op code registers 702, 704, 706, 708) according to one embodiment of the invention. As depicted, the command 808 may include the command op code, an operand length for the command 808, and an operand offset for the command 808. When a device reads the command 808, the device may use the operand length and operand offset to determine where to obtain the command operands. In one embodiment of the invention, the operand offset may specify a complete address at which the operands may be found. Optionally, the operand offset may specify an offset from a predetermined location in memory, for example, from the overlay window base address 306, from the address 802 of the command 808, or from another predetermined address.

As depicted, the operand offset may provide an offset from the address 'n' 802 of the command. The address 'i' 804 indicated by the offset may contain a first operand for the command 808. Other operands for the command 808 may be located from the address 'i' 804 to the address 'i+j' 806 indicated by the operand offset.

Performing a Data Transfer Between the Volatile Memory Array and Nonvolatile Memory As described above, the overlay window 304 may be used to issue commands to the nonvolatile memory controller 106. The issued commands may include NAND manager configuration commands and iDMA configuration commands which do not result in additional data transfers between the volatile memory 104 and the nonvolatile memory 108. Such commands may provide information to the nonvolatile memory controller 106 which is used by the controller 106 to change control register settings. The control registers settings may be used to perform subsequent data transfers or to perform NAND management functions. Commands issued by the host 102 via the overlay window 304 may also include read or write commands which transfer data from an source address in the volatile memory 104 (e.g., from an operand register 714, from the overlay window buffer 146, or from the volatile memory array 116) to a destination address in the nonvolatile memory 108 via the nonvolatile memory controller 106. The commands may also transfer data from the nonvolatile memory 108 to a location in the volatile memory 104.

In one embodiment of the invention, the data transfer command provided by the host 102 may be a DMA transfer. A first type of DMA transfer command (referred to as a STORE command) may result in data being transferred from the volatile memory array 116 to the nonvolatile memory 108 as depicted in FIG. 9A. The command may provide a specified amount of data which is to be transferred. In some cases, the iDMA controller 150 may issue requests to the volatile memory 104 for each data address which is being transferred. The requested data may then be transferred to the iDMA buffer 144 in the volatile memory 104, then to a buffer 154 in the nonvolatile memory controller 106, and finally to the destination address in the nonvolatile memory 108.

In one embodiment, the iDMA controller 150 in the nonvolatile memory controller 106 may utilize the iDMA buffer 148 to offload a portion of the DMA transfer workload. For example, the iDMA controller 150 may issue a command to the iDMA buffer controller 148 in the volatile memory 104 indicating the amount of data which is to be transferred from the volatile memory array 116 and the source address of the data to be transferred. The iDMA buffer controller 148 may then access the volatile memory array 116 and begin transferring data into the iDMA buffer 144. The iDMA buffer controller 148 may continue loading the iDMA buffer 144 until the specified amount of data has been transferred or until the buffer 144 is full.

While the iDMA buffer controller 148 is loading the iDMA buffer 144, the iDMA controller 150 in the nonvolatile memory controller 106 may determine the status of the iDMA buffer 144. Such a determination may be made, for example, by polling a buffer size information register 616 within the volatile memory 104. Optionally, such a determination may be made as a result of an interrupt issued by the iDMA buffer controller 148 in the volatile memory 104 to the nonvolatile memory controller 106. Such an interrupt may be issued, for example, when any data is placed in the buffer 144, when a predefined amount of data is placed in the buffer 144, when an amount of data specified by the iDMA controller 150 is placed in the buffer 144, and/or when the buffer 144 is full. When the iDMA buffer controller 148 determines the buffer 144 contains data, the iDMA buffer controller 148 may then load the data into the buffer 154 in the nonvolatile memory controller 106 before transferring the data to the nonvolatile memory 108.

After the iDMA controller 150 has loaded data from the iDMA buffer 144, if more data remains to be transferred from the volatile memory array 116, the iDMA controller 150 may indicate to the iDMA buffer controller 148 in the volatile memory 104 that buffer space in the buffer 144 is available and that the DMA transfer may continue. Optionally, the iDMA buffer controller 148 may monitor a status of the iDMA buffer 144 and automatically detect when buffer space is available. Upon detecting that buffer space is available, the iDMA buffer controller 148 may again continue loading the buffer 144 with data from the volatile memory array 116 into the buffer 144 until the buffer 144 is again filled or until the specified amount of data has been transferred.

As depicted in FIG. 9B, DMA transfers may also be performed from the nonvolatile memory 108 to the volatile memory array 116. The command used to perform such transfers may be referred to as a LOAD command. In some cases, as described above, the iDMA controller 150 in the nonvolatile memory controller 106 may offload DMA transfer workload to the iDMA buffer controller 148 within the volatile memory 104. For example, the iDMA controller 150 may issue a command to the iDMA buffer controller 148 indicating that data is to be transferred into the volatile memory array 116 beginning at a destination address specified by the DMA transfer command. The iDMA buffer controller 148 may then monitor the iDMA buffer 144. When the iDMA controller 150 places data from the nonvolatile memory 108 into the iDMA buffer 144, the iDMA buffer controller 148 may then begin writing the received data to the volatile memory array 116. In one embodiment, the iDMA buffer controller 148 may automatically detect that the buffer 144 contains data to be written. Optionally, the iDMA controller 150 may provide a signal (e.g., by setting a status register bit, issuing a command, or issuing an interrupt) to the iDMA buffer controller 148 when the buffer 144 contains data to be transferred to the volatile memory 116.

In some cases, the iDMA controller 150 may monitor the buffer 144 (e.g., via a buffer status register) to determine whether the buffer 144 is full and/or to determine whether to place more data in the buffer 144. Optionally, the iDMA buffer controller 148 may provide an indication (e.g., an interrupt) to the iDMA controller 150 when the buffer 144 is empty and/or when the buffer 144 contains a predefined or specified amount of free space.

In some cases, after a DMA transfer has been performed by the nonvolatile memory controller 106, the nonvolatile memory controller 106 may indicate to the host 102 via the volatile memory 104 that the command has been completed. The indication may be performed by the nonvolatile memory controller 106, for example, by setting a status register bit in one of the mode registers 170 or memory-mapped control registers 138, 140, 142. The status bit may then be polled by the host 102 to determine when the command has been completed. Optionally, after receiving a command from the nonvolatile memory controller 106 or after having a status bit set by the nonvolatile memory controller 106, the volatile memory 104 may issue an interrupt to the host 102 to indicate that the DMA transfer has been completed.

In some cases, during DMA transfers involving the volatile memory array 116, the host 102 may attempt to access the volatile memory array 116 at the same time as the nonvolatile memory controller 106 or the iDMA buffer controller 148. In such cases, the host volatile memory access control 160 and the iDMA volatile memory access control 162 may determine which access proceeds. In one embodiment, accesses by the host 102 to the volatile memory array 116 may be given precedence over accesses via the iDMA volatile memory access control 162. In some cases, where accesses are performed over multiple clock cycles, accesses by the host 102 may override and thereby interrupt accesses via the iDMA volatile memory access control 162. Optionally, whichever access is initiated first may be give preference. Furthermore, where the iDMA buffer controller 148 is performing a DMA transfer, the DMA transfer may be paused in order to allow the host 102 to access the volatile memory array 116. After the host 102 accesses the volatile memory array 116, the DMA transfer may then resume.

In one embodiment of the invention, multiple accesses to the volatile memory array 116 may be performed in parallel. For example, if an access performed by the host 102 accesses a first memory bank (e.g., bank $136_0$) within the volatile memory array 116 while an access by the iDMA buffer controller 148 accesses a second memory bank (e.g., bank $136_3$), then both accesses may be performed simultaneously without interfering with each other. Similarly, where a DMA transfer is being performed by the nonvolatile memory controller 106 which utilizes a buffer 146, 144 in the volatile memory 104, the host 102 may simultaneously perform accesses to the volatile memory array 116 without interference. Similarly, where the host 102 accesses mode registers 170, control registers 138, 140, 142 via the overlay window 304, or buffers 146 via the overlay window 304, the nonvolatile memory controller 106 (or the iDMA buffer controller 148) may simultaneously access the volatile memory array 116 without interference.

Performing a Data Transfer Between the Host and Nonvolatile Memory via the Overlay Window In one embodiment of the invention, the host 102 may issue a DMA transfer command via the overlay window 304 which transfers data between the overlay window buffer 146 and nonvolatile memory 108 as depicted in FIG. 9C. For example, the command may specify a source address within the overlay window buffer 146 and a destination address within the nonvolatile memory 108. The command may also specify an amount of data to be transferred. Upon receiving the command, the iDMA controller 150 may automatically transfer the specified amount of data from the overlay window buffer 146 to the nonvolatile memory 108. The host 102 may also issue a corresponding data command to transfer a specified amount of data from the nonvolatile memory array 108 to the overlay window buffer 146. The host 102 may then access the transferred data via the overlay window 304 as depicted in FIG. 9D.

In one embodiment of the invention, the host 102 may issue DMA transfer commands to the nonvolatile memory controller 106 which cause the iDMA controller 150 to automatically transfer data between the nonvolatile memory 108 and overlay window buffer 146. Thus, the iDMA controller, either by polling a status register or by receiving interrupts from the volatile memory 104 may determine whether data should be transferred to the overlay window buffer 146 or read from the overlay window buffer 146. The host 102 may similarly poll a status register or receive interrupts from the volatile memory 104, thereby determining whether data should be read from the overlay window buffer 146 or written to the overlay window buffer 146 for transfer to the nonvolatile memory 108.

Figure 10A:
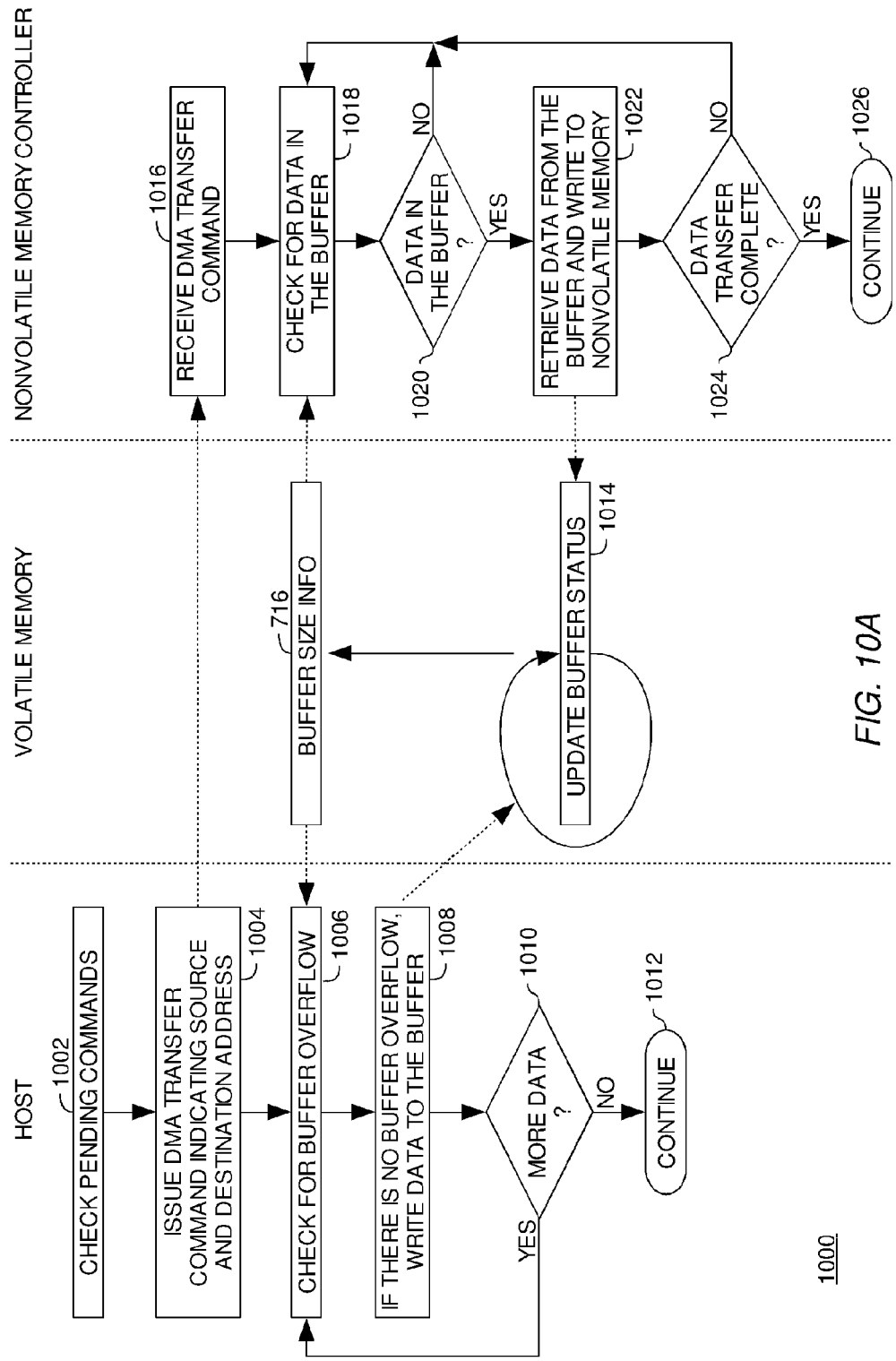
FIGS. 10A-B are flow diagrams depicting processes for performing DMA transfers between a host and nonvolatile memory according to embodiments of the invention.

FIG. 10A is a block diagram depicting a process 1000 for performing an automatic DMA transfer from the host 102 to the nonvolatile memory 108 according to one embodiment of the invention. The process 1000 may begin at step 1002 where the host 102 checks pending commands in the volatile memory 104. After determining that no commands are pending, the host 102 may issue a DMA transfer command indicating a source address in the overlay window buffer 146 and a destination address in the nonvolatile memory 108 at step 1004. The nonvolatile memory controller 106, upon detecting the command via a polled status register or interrupt from the volatile memory 104 as described above, may receive the DMA transfer command at step 1016.

After receiving the command, steps performed by the host 102 and the nonvolatile memory controller 106 may continue independently (e.g., without further commands being issued between the nonvolatile memory controller 106 and the host 102). At step 1006, the host 102 may check the overlay window buffer 146 for overflow, for example, by checking the buffer size information register 616 via the overlay window 304. Optionally, in one embodiment of the invention, an interrupt may be issued to the host 102 to indicate when the buffer 146 is empty or when a predefined amount of space is available in the buffer 146. If there is no buffer overflow, the host 102 may write data to the buffer 146 at step 1008. When the host 102 or nonvolatile memory controller 106 reads data from or transfers data to the buffer, the volatile memory 104 may update the buffer status at step 1014, for example, by modifying the settings in the buffer size information register 616.

At step 1010, the host 102 may determine if there is more data to be written to the nonvolatile memory 108. If more data is to be written, the host 102 may continue checking for space in the buffer 146 at step 1006 and writing to the buffer 146 when space is available in the buffer 146 at step 1008. Otherwise, the host 102 may continue processing data at step 1012.

While the host 102 is placing data in the buffer 146, the nonvolatile memory controller 106 may monitor the buffer 146 and read data from the buffer 146 when data is placed there by the host 102. Thus, at step 1018, the nonvolatile memory controller 106 may check for data in the buffer 146. The check may be performed, for example, by reading the buffer size information register 616 which is updated by the volatile memory 104. Optionally, an interrupt may be issued to the nonvolatile memory controller 106 when data is placed in the buffer 146, when a specified amount of data is placed in the buffer 146, or when the buffer 146 is full. If the nonvolatile memory controller 106 determines that the buffer 146 contains data at step 1020, the controller 106 may retrieve the data from the buffer 146 and write the data to the destination address within the nonvolatile memory 108. Optionally, if there is no data in the buffer 146, the controller 106 may continue checking for data at step 1018.

When the controller 106 reads data from the buffer, the buffer size information 616 may be updated by the volatile memory 104. At step 1024, the controller 106 may determine whether the data transfer is complete. If the data transfer is not complete, the controller 106 may continue checking the buffer 146 for data at step 1018. Optionally, if the data transfer is complete, then the controller 106 may continue processing data at step 1026. In one embodiment, the controller 106 may determine that a data transfer is complete by determining if a specified amount of data has been transferred. The specified amount of data may be specified, for example, by the DMA transfer command issued by the host 102. Optionally, the controller 106 may determine that the transfer is complete when a command is issued from the host 102 to the controller 106 via the overlay window 304 indicating that the transfer is complete. Optionally, the controller 106 may continually check the buffer 146 or a portion of the buffer 146 to determine is the host 102 has placed data there to be transferred to the nonvolatile memory 108.

Figure 10B:
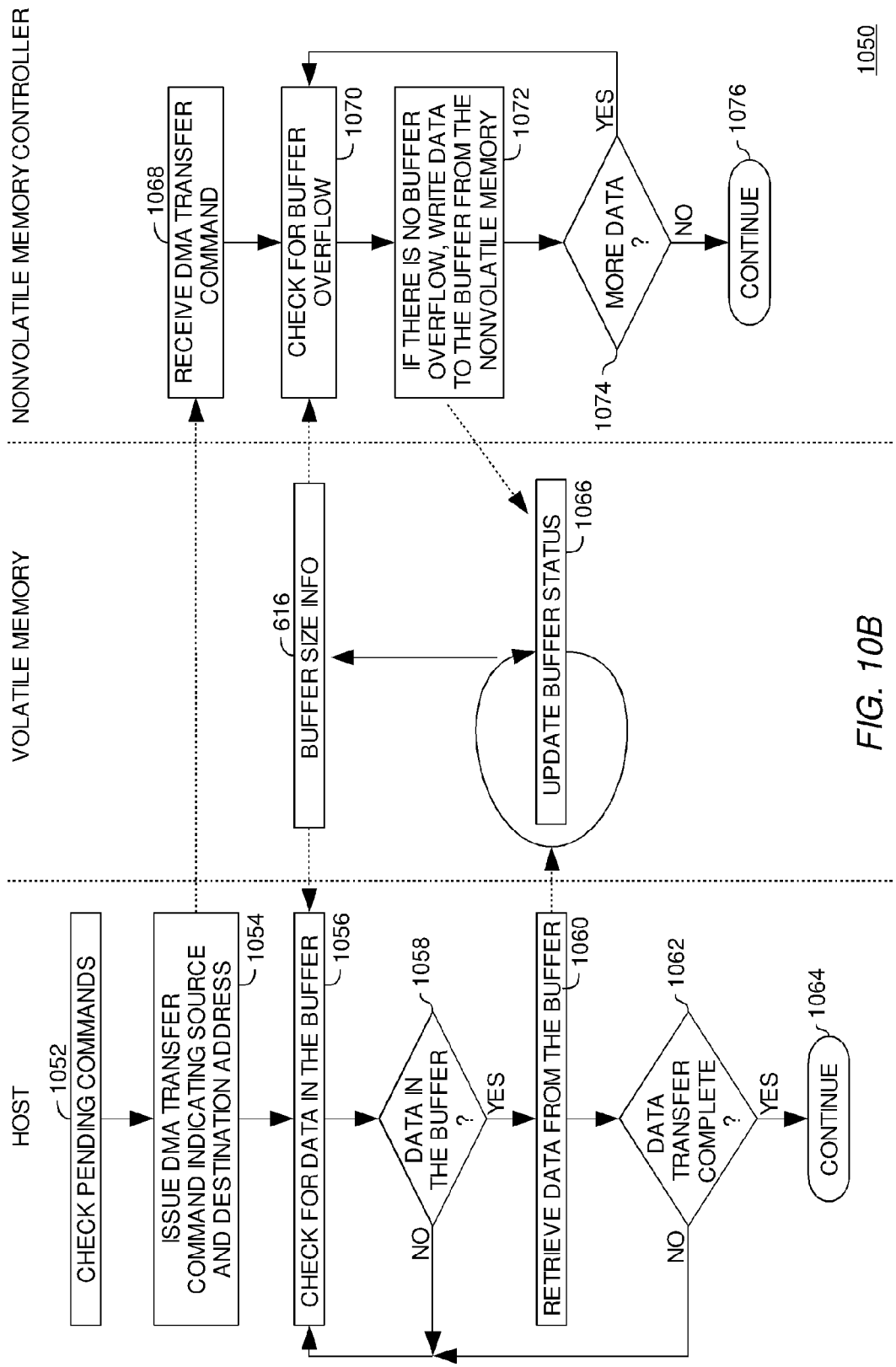

FIG. 10B is a block diagram depicting a process 1050 for performing an automatic DMA transfer from the nonvolatile memory 108 to the host 102 according to one embodiment of the invention. The process 1050 may begin at step 1052 where the host 102 checks pending commands in the volatile memory 104. After determining that no commands are pending, the host 102 may issue a DMA transfer command indicating a source address in the nonvolatile memory 108 and a destination address in the overlay window buffer 146 at step 1054. The nonvolatile memory controller 106, upon detecting the command via a polled status register or interrupt from the volatile memory 104 as described above, may receive the DMA transfer command at step 1068.

After receiving the command, steps performed by the host 102 and the nonvolatile memory controller 106 may continue independently (e.g., without further commands being issued between the nonvolatile memory controller 106 and the host 102). At step 1070, the controller 106 may check the overlay window buffer 146 for overflow, for example, by checking the buffer size information register 616 via the overlay window 304. Optionally, in one embodiment of the invention, an interrupt may be issued to the controller 106 to indicate when the buffer 146 is empty or when a predefined amount of space is available in the buffer 146. If there is no buffer overflow, the controller 106 may write data from the nonvolatile memory 108 to the buffer 146 at step 1072. When the controller 106 or host 102 reads data from or transfers data to the buffer, the volatile memory 104 may update the buffer status at step 1066, for example, by modifying the settings in the buffer size information register 616 as described above.

At step 1074, the controller 106 may determine if there is more data to be written to the buffer 146 from the nonvolatile memory 108. If more data is to be written, the controller 106 may continue checking for space in the buffer 146 at step 1070 and writing to the buffer 146 when space is available in the buffer 146 at step 1072. Otherwise, the controller 106 may continue processing data at step 1012. In one embodiment, the controller 106 may determine whether more data is to be transferred by determining if an amount of data specified by the DMA transfer command has been transferred. Optionally, the controller 106 may continue writing data until the host 102 issues a command to the controller 106 indicating that the transfer is complete.

While the controller 106 is placing data in the buffer 146, the nonvolatile host 102 may monitor the buffer 146 and read data from the buffer 146 when data is placed there by the controller 106. Thus, at step 1056, the nonvolatile memory controller 106 may check for data in the buffer 146. The check may be performed, for example, by reading the buffer size information register 616 which is updated by the volatile memory 104. Optionally, an interrupt may be issued to the host 102 when data is placed in the buffer 146, when a specified amount of data is placed in the buffer 146, or when the buffer 146 is full. If the host 102 determines that the buffer 146 contains data at step 1058, the host 102 may retrieve the data from the buffer 146. Optionally, if there is no data in the buffer 146, the host 102 may continue checking for data at step 1056.

When the host 102 reads data from the buffer, the buffer size information 616 may be updated by the volatile memory 104. At step 1062, the host 102 may determine whether the data transfer is complete. If the data transfer is not complete, the host 102 may continue checking the buffer 146 for data at step 1056. Optionally, if the data transfer is complete, then the host 102 may continue processing data at step 1064. In one embodiment, the host 102 may determine that a data transfer is complete by determining if a specified amount of data has been transferred as described above. Optionally, the host 102 may continually read data from the buffer 146 or a portion of the buffer 146 each time the host 102 requires additional data. Also, as described above, the host 102 may terminate the transfer by issuing a command to the memory controller 106 via the overlay window 304.

In one embodiment of the invention, the buffer 146 may be partitioned into multiple sections. Each section may be used to perform different DMA transfers as specified by commands issued by the host 102. Thus, in some cases, a portion of the buffer 146 may be used by the host 102 to automatically retrieve data from a source address and consecutive addresses within the nonvolatile memory 108 while another portion of the buffer 146 may be used by the host 102 to automatically write data to a destination address and consecutive addresses within the nonvolatile memory 108.

Accessing Mirrored Control Registers via the Overlay Window

In one embodiment of the invention, the host 102 may use the overlay window 304 to access remote control registers in the nonvolatile memory controller 106. The remote control registers accessible via the overlay window may include the USB/ATA control registers 158 as well as other control registers (e.g., the iDMA control registers 152). Such access may include determining the status of the control registers 158 and changing the settings of the control registers 158.

Figure 11:
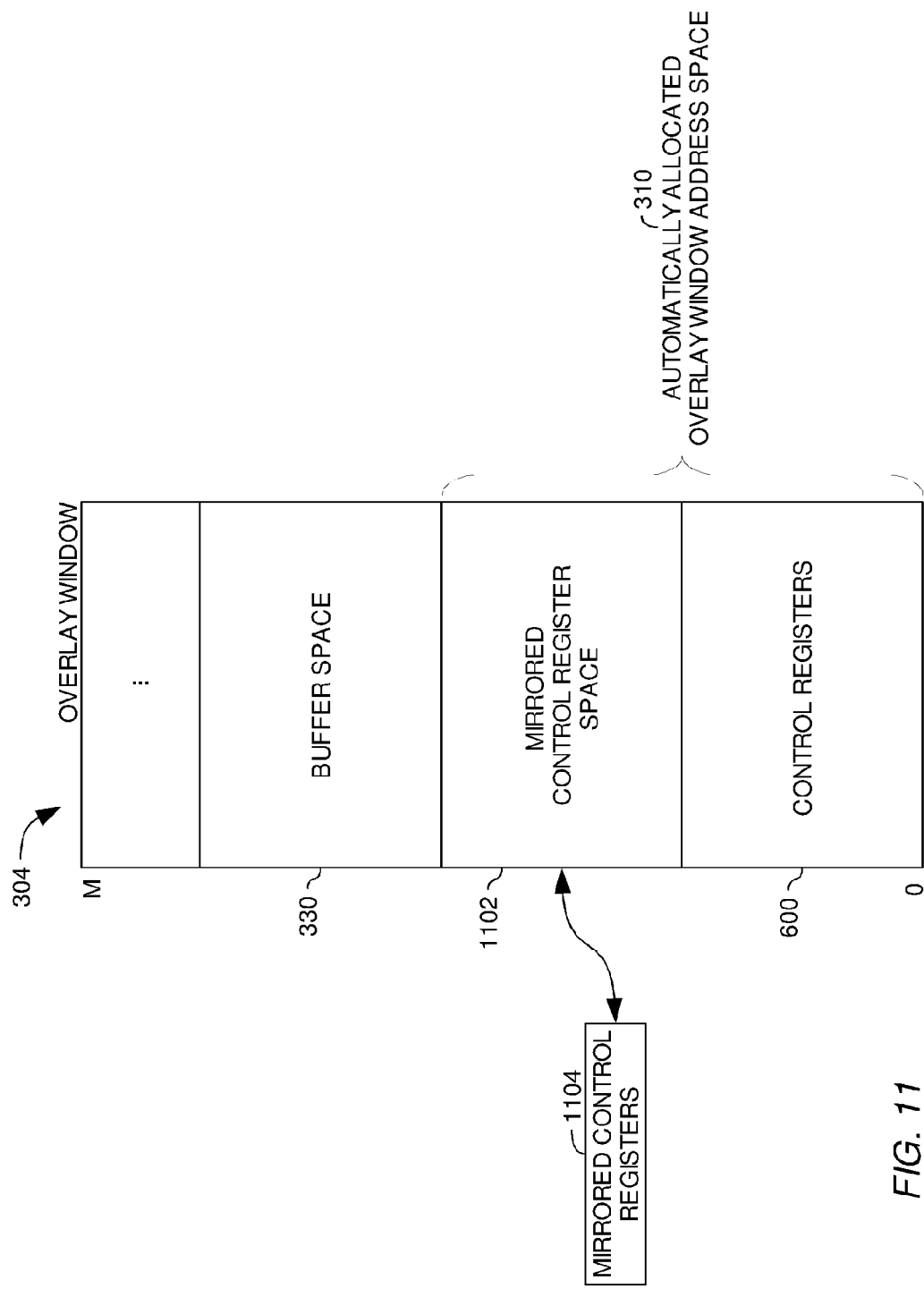
FIG. 11 is a block diagram depicting mirrored control registers accessed via an overlay window according to one embodiment of the invention.

In one embodiment, memory space 1102 within the overlay window 304 may be provided to access the mirrored control registers 1104 within the volatile memory 104 as depicted in FIG. 11. In one embodiment, the mirrored control register memory space 1102 may be located in the memory space 310 which is automatically allocated when the overlay window 304 is enabled (e.g., when the overlay window bit OWE is set). Optionally, the control register space 1102 may be allocated when the overlay window size 308 is set. In some cases, the control register space 1102 may be allocated immediately after the memory space for the control registers 600 described with respect to FIG. 6. Optionally, the control register space 1102 may be allocated after the buffer space 330. Furthermore, in one embodiment, the location of the mirrored control register space 1102 may be configurable, for example, by providing a memory-mapped control register within the overlay window 304 which may be used to specify a base address and/or size for the mirrored control register address space 1102.

Figure 12:
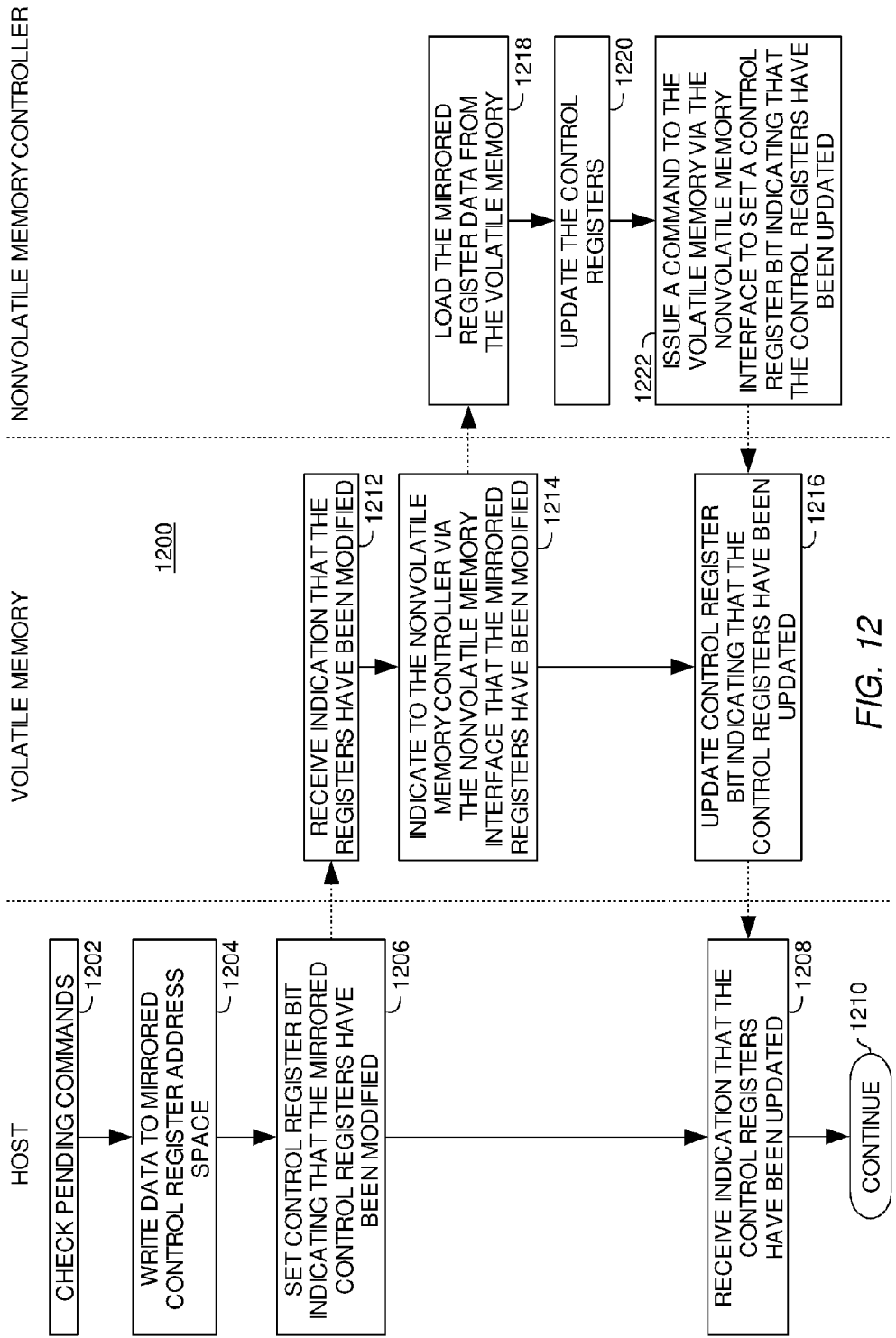
FIG. 12 is a flow diagram depicting a process for mirroring control register data according to one embodiment of the invention.

FIG. 12 is a flow diagram depicting a process 1200 for accessing the remote control registers 158 via the mirrored control registers 1104 according to one embodiment of the invention. The process 1200 may begin at step 1202 where the host 102 checks the volatile memory 104 for pending commands. When the host 102 determines that no commands are pending, the host 102 may write data to the mirrored control register address space 1102 via the volatile memory interface 112 of the volatile memory 104. The data written to the mirrored control register space 1102 may be placed in the mirrored control registers 1104. The host 102 may then set a control register bit in the volatile memory 104 at step 1206 indicating that the mirrored control registers 1104 have been modified. Optionally, the volatile memory 104 may automatically determine that the mirrored control registers 1104 have been updated.

At step 1212 the volatile memory 104 may receive the indication that the mirrored control registers 1104 have been modified. The volatile memory 104 may then indicate to the nonvolatile memory controller 106 at step 1214 that the mirrored control registers 1104 have been modified. The indication may be provided to the nonvolatile memory controller 106 either by issuing an interrupt to the nonvolatile memory controller 106 or by setting a status bit which may be polled by the nonvolatile memory controller 106. Upon receiving the indication that the mirrored registers 1104 have been modified, the nonvolatile memory controller 106 may load the data from the mirrored registers 1104 within the volatile memory 104 at step 1218 and place the loaded data in the control registers 158 at step 1220.

At step 1222, the nonvolatile memory controller 106 may issue a command to volatile memory 104 to set a control register bit indicating that the remote control registers 158 have been successfully updated. In some cases, the nonvolatile memory controller 106 may also provide a copy of updated information from the remote control registers 158 to be placed in the mirrored control registers 1104 within the volatile memory 104. At step 1216, the volatile memory 104 may update the control register bit indicating that the remote control registers 158 have been updated. The host 102 may receive the indication that the control registers 158 have been updated at step 1208. The process 1200 may then continue at step 1210.

While described above with respect to mirroring which is performed as a result of commands issued by the host 102, in some cases, mirroring may be performed automatically by the volatile memory 104 (e.g., by setting a status register bit checked by the nonvolatile memory controller 106 or by issuing an interrupt to the nonvolatile memory controller 106), for example, each time the mirrored control registers 1104 are updated. When the status register bit or interrupt is detected by the memory controller 106, the memory controller 106 may automatically load the mirrored control registers 1104 into the remote control registers 158. Optionally, the mirroring may be performed by the volatile memory 104 at a specified interval.

Furthermore, in some cases, mirroring of updated data from the remote control registers 158 may be initiated by the nonvolatile memory controller 106, for example, by issuing commands to or writing data to the volatile memory 104 containing updated data from the remote control registers 158 to be placed in the mirrored control registers 1104. In one embodiment, the nonvolatile memory controller 106 may initiate the mirroring periodically, for example, at a specified interval. The specified interval, in one embodiment, may be specified by the host 102 via the mirrored control registers 1104. Optionally, the nonvolatile memory controller 106 may update the mirrored control registers 1104 each time the remote control registers 158 are modified.

In one embodiment, when the mirrored control registers 1104 are updated by the nonvolatile memory controller 106, the volatile memory 104 may provide an indication of the updating for the host 102. The indication may be provided, for example, by issuing an interrupt from the volatile memory 104 to the host 102 or by setting a status register bit in the volatile memory 104 which may be accessed (e.g., polled) by the host 102 via the mode registers 170 or via one of the sets of memory-mapped control registers 138, 140, 142.

CONCLUSION

While described above with respect to a processor which accesses a volatile memory and a nonvolatile memory through a volatile memory interface, embodiments of the invention may also be used in embedded systems where the host processor accesses additional memory components (e.g., volatile memories and nonvolatile memories) via additional interfaces. Similarly, while described above with respect to a volatile memory, nonvolatile memory, and nonvolatile memory controller which are fabricated on separate dies, embodiments of the invention may also be utilized wherein separate components (e.g., the volatile memory and the nonvolatile memory controller or the nonvolatile memory and the nonvolatile memory controller) are fabricated on the same die.

While the foregoing is directed to embodiments of the present invention, other and further embodiments of the invention may be devised without departing from the basic scope thereof, and the scope thereof is determined by the claims that follow.

What is claimed is:

1. A method for accessing data in a nonvolatile memory device via a volatile memory device, the method comprising:
configuring a size and a base address of an overlay window within an address space of the volatile memory device, wherein the overlay window comprises a range of memory addresses;
receiving an access command via a volatile memory interface of the volatile memory device;
using the access command to access a memory array of the volatile memory device if an address of the access command is outside of the overlay window; and
using the access command to access the nonvolatile memory device via a nonvolatile memory interface of the volatile memory device if the address of the access command is within the overlay window.

2. The method of claim 1, wherein using the access command to access the nonvolatile memory device comprises:
notifying a nonvolatile memory controller of the access command via the nonvolatile memory interface of the volatile memory device;
providing data to be written to the nonvolatile memory device to the nonvolatile memory controller if the access command is a write command; and
receiving data from the nonvolatile memory controller via the nonvolatile memory interface if the access command is a read command.

3. The method of claim 2, wherein notifying the nonvolatile memory controller of the access command comprises setting a status register bit in the volatile memory device.

4. The method of claim 2, wherein notifying the nonvolatile memory controller of the access command comprises issuing an interrupt to the nonvolatile memory controller.

5. The method of claim 1, wherein using the access command to access the nonvolatile memory device comprises placing data for the access command in a buffer within the volatile memory device, wherein the data is automatically transferred to the nonvolatile memory device by a nonvolatile memory controller via the nonvolatile memory interface.

6. The method of claim 1, wherein using the access command to access the nonvolatile memory device comprises reading data for the access command from a buffer within the volatile memory device, wherein the data is automatically transferred to the buffer from the nonvolatile memory device by a nonvolatile memory controller via the nonvolatile memory interface.

7. The method of claim 1, wherein configuring the size and the base address of the overlay window comprises loading the size and base address from a plurality of reset pins upon detecting that the volatile memory device has been reset.

8. A method for accessing data in a nonvolatile memory device via a volatile memory device, the method comprising:
issuing one or more commands to the volatile memory device indicating a size and a base address of an overlay window within an address space of the volatile memory device, wherein the overlay window comprises a range of memory addresses;
issuing an access command via a volatile memory interface of the volatile memory device, wherein:
the access command is used to access a memory array of the volatile memory device if an address of the access command is outside of the overlay window; and
the access command is used to access the nonvolatile memory device via a nonvolatile memory interface of the volatile memory device if the address of the access command is within the overlay window.

9. The method of claim 8, wherein issuing the access command to the volatile memory device comprises:
writing the access command to an address of a memory-mapped register within the overlay window.

10. The method of claim 9, further comprising:
setting a control register bit in the volatile memory device indicating that the access command has been written to the address of the memory-mapped register within the overlay window.

11. The method of claim 8, wherein issuing the access command to the volatile memory device comprises:
writing data to a buffer within the volatile memory device, wherein the buffer is accessed via the overlay window, and wherein a nonvolatile memory controller is configured to automatically read the data from the buffer via a nonvolatile memory interface of the volatile memory device and write the data to the nonvolatile memory device.

12. The method of claim 8, wherein issuing the access command to the volatile memory device comprises:
issuing a direct memory access command to a nonvolatile memory controller via the overlay window, wherein, in response to receiving the command, the nonvolatile memory controller is configured to read data from the nonvolatile memory and transfer the data to a buffer within the volatile memory device; and
reading data from the buffer within the volatile memory device, wherein the buffer is accessed via the overlay window.

13. The method of claim 8, wherein issuing the one or more commands to the volatile memory device indicating the size and the base address of the overlay window within the address space of the volatile memory device comprises:
issuing a mode register set (MRS) command to the volatile memory device, wherein the MRS command provides at least a portion of the base address of the overlay window; and
issuing a write command which writes the size of the overlay window to an address of a memory-mapped register within the overlay window.

14. A volatile memory device comprising:
a volatile memory interface;
a nonvolatile memory interface;
a volatile memory array;
control circuitry configured to:
configure a size and a base address of an overlay window within an address space of the volatile memory device, wherein the overlay window comprises a range of memory addresses;
receive an access command via the volatile memory interface;
use the access command to access the volatile memory array of the volatile memory device if an address of the access command is outside of the overlay window; and
use the access command to access a nonvolatile memory device via the nonvolatile memory interface of the volatile memory device if the address of the access command is within the overlay window.

15. The volatile memory device of claim 14, wherein using the access command to access the nonvolatile memory device comprises:
notifying a nonvolatile memory controller of the access command via the nonvolatile memory interface;
providing data to be written to the nonvolatile memory device to the nonvolatile memory controller if the access command is a write command; and
receiving data from the nonvolatile memory controller via the nonvolatile memory interface if the access command is a read command.

16. The volatile memory device of claim 15, wherein notifying the nonvolatile memory controller of the access command comprises setting a status register bit in the volatile memory device.

17. The volatile memory device of claim 15, wherein notifying the nonvolatile memory controller of the access command comprises issuing an interrupt to the nonvolatile memory controller.

18. The volatile memory device of claim 14, wherein using the access command to access the nonvolatile memory device comprises placing data for the access command in a buffer within the volatile memory device, wherein the data is automatically transferred to the nonvolatile memory device by a nonvolatile memory controller via the nonvolatile memory interface.

19. The volatile memory device of claim 14, wherein using the access command to access the nonvolatile memory device comprises reading data for the access command from a buffer within the volatile memory device, wherein the data is automatically transferred to the buffer from the nonvolatile memory device by a nonvolatile memory controller via the nonvolatile memory interface.

20. The volatile memory device of claim 14, wherein configuring the size and the base address of the overlay window comprises loading the size and base address from a plurality of reset pins upon detecting that the volatile memory device has been reset.

21. A processor comprising:
an interface for communicating with a volatile memory device;
control circuitry configured to:
issue one or more commands to the volatile memory device indicating a size and a base address of an overlay window within an address space of the volatile memory device, wherein the overlay window comprises a range of memory addresses;

issue an access command to the volatile memory device, wherein:
  the access command is used to access a memory array of the volatile memory device if an address of the access command is outside of the overlay window; and
  the access command is used to access the nonvolatile memory device via a nonvolatile memory interface of the volatile memory device if the address of the access command is within the overlay window.

22. The processor of claim 21, wherein issuing the access command to the volatile memory device comprises:
  writing the access command to an address of a memory-mapped register within the overlay window.

23. The processor of claim 21, wherein issuing the access command to the volatile memory device comprises:
  writing data to a buffer within the volatile memory device, wherein the buffer is accessed via the overlay window, and wherein a nonvolatile memory controller is configured to automatically read the data from the buffer via a nonvolatile memory interface of the volatile memory device and write the data to the nonvolatile memory device.

24. The processor of claim 21, wherein issuing the access command to the volatile memory device comprises:
  issuing a direct memory access command to a nonvolatile memory controller via the overlay window, wherein, in response to receiving the command, the nonvolatile memory controller is configured to read data from the nonvolatile memory and transfer the data to a buffer within the volatile memory device; and
  reading data from the buffer within the volatile memory device, wherein the buffer is accessed via the overlay window.

25. The processor of claim 21, wherein issuing the one or more commands to the volatile memory device indicating a size and a base address of an overlay window comprises:
  issuing a mode register set (MRS) command to the volatile memory device, wherein the MRS command provides at least a portion of the base address of the overlay window; and
  issuing a write command which writes the size of the overlay window to an address of a memory-mapped register within the overlay window.

26. A system comprising:
  a volatile memory device comprising:
    a volatile memory interface;
    a first nonvolatile memory interface;
    a buffer;
    a control register; and
    a volatile memory array;
  a nonvolatile memory;
  a nonvolatile memory controller configured to access the volatile memory via the first nonvolatile memory interface and access the nonvolatile memory via a second nonvolatile memory interface; and
  a processor configured to:
    issue one or more commands to the volatile memory device indicating a size and a base address of an overlay window within an address space of the volatile memory device, wherein the overlay window comprises a range of memory addresses;
    issue an access command to the volatile memory device, wherein:
      the access command is used to access a memory array of the volatile memory device if an address of the access command is outside of the overlay window; and
      the access command is used to access the nonvolatile memory device via the first nonvolatile memory interface of the volatile memory device if the address of the access command is within the overlay window.

27. The system of claim 26, wherein issuing the access command to the volatile memory device comprises:
  writing the access command to an address of a memory-mapped register within the overlay window.

28. The system of claim 26, wherein issuing the access command to the volatile memory device comprises:
  writing data to a buffer within the volatile memory device, wherein the buffer is accessed via the overlay window, and wherein the nonvolatile memory controller is configured to automatically read the data from the buffer via the first nonvolatile memory interface of the volatile memory device and write the data to the nonvolatile memory device.

29. The system of claim 26, wherein issuing the access command to the volatile memory device comprises:
  issuing a direct memory access command to the nonvolatile memory controller via the overlay window, wherein, in response to receiving the command, the nonvolatile memory controller is configured to read data from the nonvolatile memory and transfer the data to a buffer within the volatile memory device; and
  reading data from the buffer within the volatile memory device, wherein the buffer is accessed via the overlay window.

30. The system of claim 26, wherein issuing the one or more commands to the volatile memory device indicating the size and the base address of the overlay window comprises:
  issuing a mode register set (MRS) command to the volatile memory device, wherein the MRS command provides at least a portion of the base address of the overlay window; and
  issuing a write command which writes the size of the overlay window to an address of a memory-mapped register within the overlay window.

31. A volatile memory device comprising:
  a means for interfacing the volatile memory device;
  a means for interfacing nonvolatile memory;
  a means for storing;
  control circuitry configured to:
    configure a size and a base address of an overlay window within an address space of the volatile memory device, wherein the overlay window comprises a range of memory addresses;
    receive an access command via the means for interfacing the volatile memory device;
    use the access command to access the means for storing if an address of the access command is outside of the overlay window; and
    use the access command to access a nonvolatile memory device via the means for interfacing nonvolatile memory if the address of the access command is within the overlay window.

32. The volatile memory device of claim 31, wherein using the access command to access the nonvolatile memory device comprises:
  notifying a nonvolatile memory controller of the access command via the means for interfacing nonvolatile memory;

providing data to be written to the nonvolatile memory device to the nonvolatile memory controller if the access command is a write command; and receiving data from the nonvolatile memory controller via the means for interfacing nonvolatile memory if the access command is a read command.

33. The volatile memory device of claim 32, wherein notifying the nonvolatile memory controller of the access command comprises setting a status register bit in the volatile memory device.

34. The volatile memory device of claim 32, wherein notifying the nonvolatile memory controller of the access command comprises issuing an interrupt to the nonvolatile memory controller.

35. The volatile memory device of claim 31, wherein using the access command to access the nonvolatile memory device comprises placing data for the access command in a means for buffering within the volatile memory device, wherein the data is automatically transferred to the nonvolatile memory device by a nonvolatile memory controller via the means for interfacing nonvolatile memory.

36. The volatile memory device of claim 31, wherein using the access command to access the nonvolatile memory device comprises reading data for the access command from a means for buffering within the volatile memory device, wherein the data is automatically transferred to the means for buffering from the nonvolatile memory device by a nonvolatile memory controller via the means for interfacing nonvolatile memory.

37. The volatile memory device of claim 31, wherein configuring the size and the base address of the overlay window comprises loading the size and base address from a plurality of reset pins upon detecting that the volatile memory device has been reset.

* * * * *